(12) United States Patent
Chen et al.

(10) Patent No.: US 7,694,291 B2
(45) Date of Patent: Apr. 6, 2010

(54) BUILD OPTIMIZER TOOL FOR EFFICIENT MANAGEMENT OF SOFTWARE BUILDS FOR MOBILE DEVICES

(75) Inventors: Shao-Chun Chen, Aliso Viejo, CA (US); Iyad Qumei, Huntington Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1089 days.

(21) Appl. No.: 11/352,813

(22) Filed: Feb. 13, 2006

(65) Prior Publication Data

US 2007/0050762 A1 Mar. 1, 2007

Related U.S. Application Data

(63) Continuation-in-part of application No. 11/100,305, filed on Apr. 6, 2005.

(60) Provisional application No. 60/559,750, filed on Apr. 6, 2004, provisional application No. 60/652,444, filed on Feb. 11, 2005.

(51) Int. Cl.
*G06F 9/44* (2006.01)
*G06F 9/445* (2006.01)

(52) U.S. Cl. .................. 717/162; 717/165; 717/168; 717/169; 717/170; 717/174; 717/175; 717/177; 717/178

(58) Field of Classification Search .......... 717/168–178
See application file for complete search history.

(56) References Cited

U.S. PATENT DOCUMENTS

| | | | | |
|---|---|---|---|---|
| 4,809,170 A | * | 2/1989 | Leblang et al. | 717/122 |
| 5,204,960 A | * | 4/1993 | Smith et al. | 717/145 |
| 5,325,531 A | * | 6/1994 | McKeeman et al. | 717/145 |
| 5,491,821 A | * | 2/1996 | Kilis | 717/146 |
| 5,586,328 A | * | 12/1996 | Caron et al. | 717/146 |
| 5,649,200 A | * | 7/1997 | Leblang et al. | 717/122 |
| 6,029,004 A | * | 2/2000 | Bortnikov et al. | 717/158 |
| 6,289,509 B1 | * | 9/2001 | Kryloff | 717/170 |
| 6,425,125 B1 | * | 7/2002 | Fries et al. | 717/168 |
| 6,526,574 B1 | * | 2/2003 | Jones | 717/168 |
| 6,594,822 B1 | * | 7/2003 | Schweitz et al. | 717/140 |
| 6,698,013 B1 | * | 2/2004 | Bertero et al. | 717/127 |
| 6,925,467 B2 | * | 8/2005 | Gu et al. | 707/101 |
| 6,983,458 B1 | * | 1/2006 | Honda | 717/151 |
| 7,003,534 B2 | * | 2/2006 | Peng | 707/203 |
| 7,007,049 B2 | * | 2/2006 | Peng | 707/205 |
| 7,032,033 B1 | * | 4/2006 | Ledoux et al. | 709/248 |
| 7,313,791 B1 | * | 12/2007 | Chen et al. | 717/170 |
| 7,367,027 B1 | * | 4/2008 | Chen et al. | 717/168 |
| 7,555,750 B1 | * | 6/2009 | Lilley | 717/168 |
| 2002/0046400 A1 | * | 4/2002 | Burch | 717/154 |
| 2004/0006760 A1 | * | 1/2004 | Gove et al. | 717/100 |
| 2004/0073901 A1 | * | 4/2004 | Imamatsu | 717/170 |
| 2004/0088694 A1 | * | 5/2004 | Ho | 717/170 |
| 2004/0111702 A1 | * | 6/2004 | Chan | 717/113 |

(Continued)

*Primary Examiner*—Wei Y Zhen
*Assistant Examiner*—Sao Lu

(57) ABSTRACT

A build optimization tool analyzes builds of software/firmware to determine the ordering of code objects in first and second code versions for an electronic client device such as a cellular phone, personal digital assistant, or pager. The build optimization tool produces information for use by a software linker to link the code objects of the second code version in a more optimal order for the production of updating information used in the electronic client device for updating the software/firmware of the electronic client device.

38 Claims, 16 Drawing Sheets

U.S. PATENT DOCUMENTS

| | | | |
|---|---|---|---|
| 2004/0117760 A1* | 6/2004 | McFarling | 717/101 |
| 2005/0216902 A1* | 9/2005 | Schaefer | 717/168 |
| 2005/0278715 A1* | 12/2005 | Herle et al. | 717/162 |
| 2006/0059481 A1* | 3/2006 | Smith et al. | 717/173 |
| 2007/0220504 A1* | 9/2007 | Eker | 717/168 |
| 2008/0196019 A1* | 8/2008 | Meller et al. | 717/168 |
| 2009/0113386 A1* | 4/2009 | Eker et al. | 717/108 |

* cited by examiner

Generator uses information created by the Object Ordering Tool

300

```
LOAD_REGION_1   [Load Base Address] [Region MAX Size]
{
        EXEC_REGION_1 [Execution Base Address] [Region MAX Size]
        {
           object.o (Attributes)
           library.o(Attributes)
            * (+RO)    ; Code
        }
        EXEC_REGION_2  [Execution Base Address] [Region MAX Size]
        {
           object.o (Attributes)
           library.o(Attributes)
            * (+RW)   ; Data
        }
        EXEC_REGION_2  [Execution Base Address] [Region MAX Size]
        {
           object.o (Attributes)
           library.o(Attributes)
            * (+ZI)           ; Uninitialized, Zero
        }
}

LOAD_REGION_2   [Load Base Address] [Region MAX Size]
{
        EXEC_REGION_1 [Execution Base Address] [Region MAX Size]
        {
           object.o (Attributes)
           library.o(Attributes)
            * (+RO)    ; Code
        }
        EXEC_REGION_2 [Execution Base Address] [Region MAX Size]
        {
           object.o (Attributes)
           library.o(Attributes)
            * (+RW, +ZI)     ; Data
        }
}
```

Figure 4A

```
SECTIONS   [Virtual Memory Address] :[AT Load Memory Address]
{
    . = Code Base Address
    .text : {
        object.o
        library.o
        * (.text)
    }
    . = Data Base Address
    .data : {
        object.o
        library.o
        * (.data)
    }
    .bss : {
        object.o
        library.o
        * (.bss)
    }
}

MEMORY
{
    ROM (RX) : ORIGIN = Base Address, LENGTH = Memory Device Size
    RAM (RW) : ORIGIN = Base Address, LENGTH = Memory Device Size
}
```

Figure 4B

BUILD OPTIMIZER TOOL FOR EFFICIENT MANAGEMENT OF SOFTWARE BUILDS FOR MOBILE DEVICES

RELATED APPLICATIONS

The present application is a continuation in part of prior U.S. patent application Ser. No. 11/100,305 entitled "OBJECT ORDERING TOOL FOR FACILITATING GENERATION OF FIRMWARE UPDATE FRIENDLY BINARY IMAGE", filed Apr. 6, 2005, which makes reference to, claims priority to and claims benefit from U.S. Provisional Patent Applications Ser. No. 60/559,750, entitled "OBJECT ORDERING TOOL FOR FACILITATING GENERATION OF FIRMWARE UPDATE FRIENDLY BINARY IMAGE", filed on Apr. 6, 2004, and makes reference to, claims priority to and claims benefit from U.S. Provisional Patent Application Ser. No. 60/652,444, entitled "BUILD OPTIMIZER TOOL FOR EFFICIENT MANAGEMENT OF SOFTWARE BUILDS FOR MOBILE DEVICES", filed Feb. 11, 2005, the complete subject matter of each of which is hereby incorporated herein by reference, in its entirety.

This patent application makes reference to U.S. patent application Ser. No. 10/646,230, entitled "MOBILE HANDSET UPDATE PACKAGE GENERATOR THAT EMPLOYS NODES TECHNIQUE", filed on Aug. 22, 2003, and to U.S. Provisional Patent Application Ser. No. 60/441,867 entitled "MOBILE HANDSET UPDATE PACKAGE GENERATOR THAT EMPLOYS NODES TECHNIQUE", filed Jan. 22, 2003, the complete subject matter of each of which is hereby incorporated herein by reference, in its entirety.

The present application also makes reference to PCT Application having publication number WO/02/41147 A1 and PCT Application No. PCT/US01/44034, entitled "SYSTEM AND METHOD FOR UPDATING AND DISTRIBUTING INFORMATION", filed Nov. 19, 2001, and U.S. Provisional Patent Application Ser. No. 60/249,606, entitled "SYSTEM AND METHOD FOR UPDATING AND DISTRIBUTING INFORMATION", filed Nov. 17, 2000, the complete subject matter of each of which is hereby incorporated herein by reference, in its entirety.

The present application also makes reference to U.S. Pat. No. 6,832,373, entitled "SYSTEM AND METHOD FOR UPDATING AND DISTRIBUTING INFORMATION", issued Dec. 14, 2004, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs and a device management (DM) server often facilitates bug fixing operations. It is often not clear who should pay for the ensuing data traffic. It is also not clear how a carrier network can support different billing models when it comes to data traffic due to device management activities.

Differencing algorithms are typically used in a generator that is employed to create update packages for updating firmware and software in devices, to generate difference information that are packaged in update packages. For several reasons, it is desirable for update packages to be small. Unfortunately, there is only so much that can be done by differencing algorithms used in present-day generators. There is a problem of getting the update packages to be small when the differencing algorithms, and generators in general, cannot make them any smaller or any more compact.

Quite often, the manufacturer of an electronic device modifies the order in which software components are organized in the non-volatile memory of the device. When this happens, differencing engines create update packages that are very large, because the apparent changes between one version and another seem exaggerated due to movements of software components in the software image of the device. Such exaggerated differences between one version of a build image of an electronic device and another version due to movements of software components makes update packages larger and download time longer. It is often difficult to compress an update package into a manageable size. The same compression problem is encountered in the generation of new update packages from a pair of old and new firmware versions.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for optimizing software/firmware builds used in the generation of updating information for updating code in an electronic device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4A is a listing of an exemplary linker script file describing memory layout and mapping rules for the ARM Developer Studio (ADS), from ARM Ltd., for example object and library binary image files, in accordance with a representative embodiment of the present invention.

FIG. 4B is a listing of an exemplary linker script file describing memory layout and mapping rules for the GNU GCC linker, for example object and library binary image files, in accordance with a representative embodiment of the present invention.

DETAILED DESCRIPTION OF THE INVENTION

The present invention relates generally to the generation of update packages for firmware and software updates for mobile devices. More specifically, representative embodiments of the present invention relate to a method of optimizing the building of software/firmware update packages by analyzing elements of a software/firmware build, and generating information used by an object code linker to produce binary images that result in more compact update packages. Although the following discusses aspects of the invention in terms of a mobile handset, it should be clear that the following also applies to other mobile electronic devices such as, for example, personal digital assistants (PDAs), pagers, personal computers (PCs), and similar handheld electronic devices having a processor with memory containing firmware and/or software.

Figure 1A:
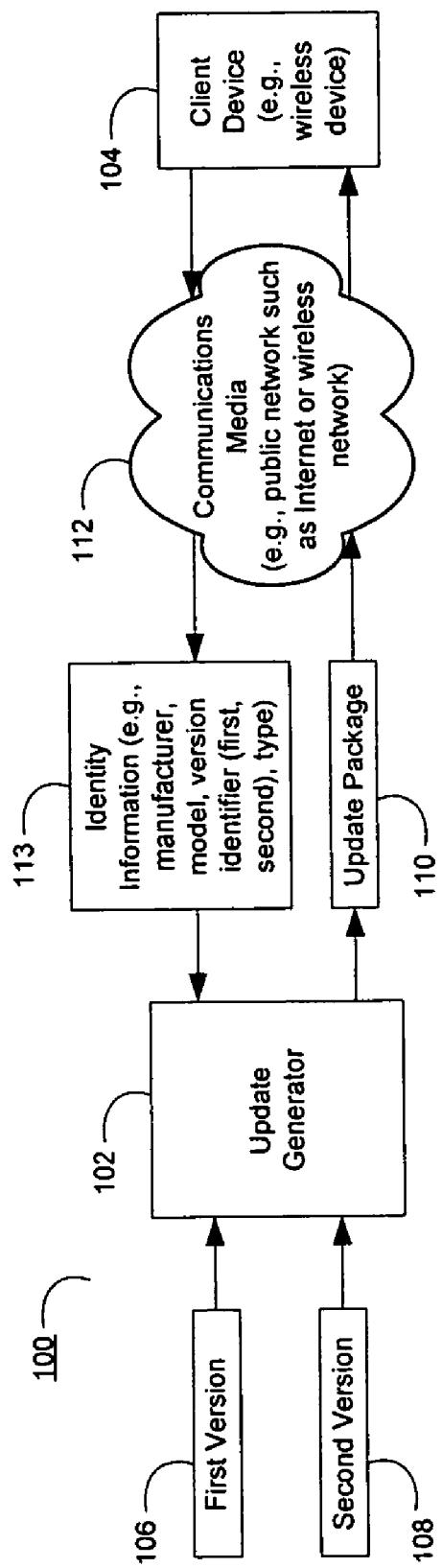
FIG. 1A illustrates an exemplary embodiment of an update distribution system, in which a representative embodiment of the present invention may be practiced.

FIG. 1A illustrates an exemplary embodiment of an update distribution system 100, in which a representative embodiment of the present invention may be practiced. The update distribution system 100 includes an update generator 102 and a client device 104. In one embodiment, the update generator 102 receives a first code version 106, such as an old version of a software application, and a second code version 108, such as a new version of a software application. The update generator 102 produces an update package 110 comprising an instruction set which represents a plurality of operations that are desirably used to transform the first original code version 106 into the second updated code version. The update package 110 is then transferred to a client device 104 via a communications medium 112. Viable choices for communications media 112 may include hardwired media, removable storage media, wireless media, volatile and non-volatile memory based media, and the Internet. Other communications media 112 may include by way of example, local area networks (LANs), wide area networks (WANs), public Internets, private Internets, a private computer network, a secure Internet, a private network, a public network, a value-added network, interactive television networks, wireless data transmission networks, two-way cable networks, interactive kiosk networks, and the like. In addition, the client device 104 may comprise numerous types of devices capable of receiving and processing the update package 110, such as computers, personal digital assistants (PDAs), hardwired phones, mobile phones, pagers, electronic peripheral devices, appliances, and other such devices capable of being configured to receive the update package.

In one aspect, the instruction set utilizes a conversion process employed by the client device 104 to efficiently convert the existing first code version 106 to the second code version 108. The instruction set and the implementation of the conversion process will be discussed in greater detail herein below.

At least one method by which the client device 104 may securely and reliably obtain the update package 110 from the update generator 102 may occur by transfer of information in the form of the update package 110 through at least one of the above-mentioned communications media types. The client device 104 may further be equipped with the capability to bi-directionally communicate with the update generator 102. In one embodiment, the client device 104 transfers identity information 113, including type, model, and/or make of the device, as well as the version of operational software or applications currently in use by the client device 104. The update generator 102 receives the identity information 113 from the client device 104 and subsequently generates the desired update package 110 required and/or requested by the client device 104. Alternatively, the update generator 102 may be equipped with the ability to generate and provide a plurality of update packages 110, which reference a plurality of operational software versions or applications, prior to receiving the identity information 113. In this embodiment, the update generator 102 may retrieve from memory or storage an archived version of the desired update package 110a. In addition, the update generator 102 may create a version manifest, which comprises a list of archived update packages 110 including operational software version information for a wide range of particular client devices 104. Once the update package 110 is generated, validated, and deemed available, the update generator 102 may function as a server and transfer the desired update package 110 to the client device 104 as requested or required. It will be appreciated that one or more update packages 110 may be generated and archived as updated versions of operational software become available. Furthermore, update packages 110 can be prepared for use with hardware update systems, such as may be required, for example, to update non-volatile memory components or portable electronic devices. One desirable feature of the update management system is that it may be readily adapted for use in wireless update procedures or over the air (OTA) updating. This method allows updates for software or firmware components in devices without hardware changes. The updating methods described herein can further be used to update a client device including applications, operational functionality, operating system software and the like. Furthermore, the updating operations can correct errors or problems with existing code resident in the device, add new features or functionality, change or modify resident applications, or perform other desired update operations in a manner that will be described in greater detail herein below.

In one representative embodiment of the present invention, the update generator 102 comprises a single computing device or server component which is responsible for both generating and distributing update packages 110. The update generator 102 is equipped to run specialized software to construct the instruction set of the update package 110 for the client device 104. Moreover, the update generator 102 creates the update package 110 by comparing the first code version 106 to the second code version 108. The update package 110 desirably includes mathematical operations and instructions coded into the instruction set which transform the first code version 106 into the second code version 108. A principle feature of the update management system is that update packages 110 are generated in such a way so as to utilize existing code or information resident on the device. The methods for update package generation are specifically designed to analyze the differences between the code versions 106, 108 and make use of existing information sequences in the device when possible to transform the first code version 106 into the second code version 108. This feature is significant in that it significantly reduces the size of the update package compared to conventional methods. In one aspect, the file size of the update package 110 may be reduced by more than 90 percent with respect to the first code version 106. Advantageously, since the file size of the update package 110 is relatively small and compact, the update package 110 may be easily transferred and stored in a memory component of the client device 104 without significantly altering the memory allocation size and bandwidth specifications of the client device 104. In one aspect the update generator 102 generates and archives a plurality of update packages 110 for distribution to one or more different types of client devices 104. Each client device 104 may then request transfer of the desired update package 110 which is selectively sent by the server.

Figure 1B:
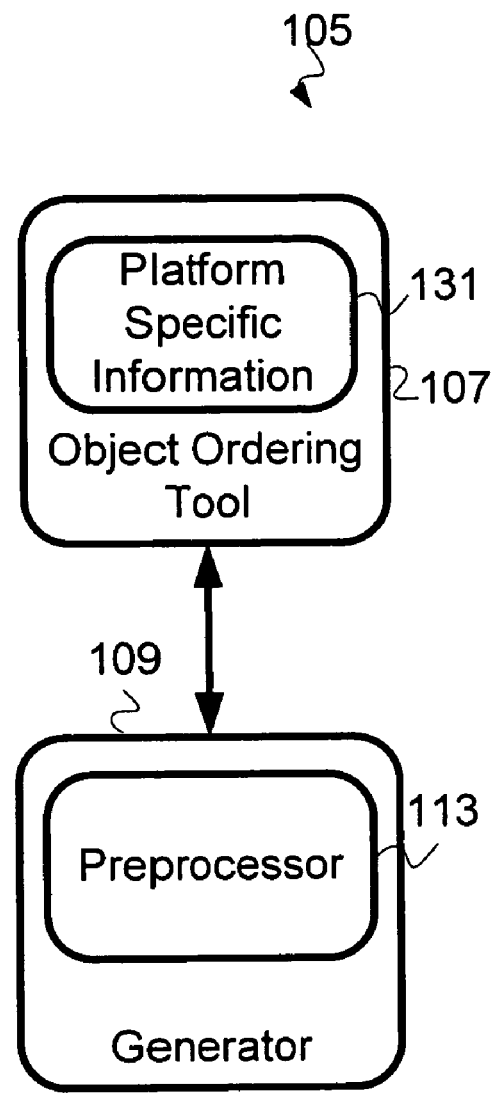
FIG. 1B is a perspective diagram of an update package generation environment that comprises an object ordering tool and a generator, in accordance with a representative embodiment of the present invention.

FIG. 1B is a perspective diagram of an update package generation environment 105 that comprises an object ordering tool 107 and a generator 109, in accordance with a representative embodiment of the present invention. The object ordering tool 107 may employ platform specific information 131 related to, for example, the processor used in the electronic device to be updated, and to code development tools used to produce firmware and/or software for the electronic device. The generator 109 may comprise a preprocessor 113 capable of adapting firmware and/or software used by the generator 109 in the production of an update package used by the electronic device for updating firmware and/or software in the electronic device. The firmware and/or software in a mobile electronic device may comprise a number of code objects. During the development of an updated version of code for the mobile electronic device, one or more of the code objects may change. The object ordering tool 107 may be capable of generating object ordering information that may be subsequently employed in the generator 109 to generate compact update packages for updating firmware and/or software in mobile electronic devices such as, for example, mobile handsets, personal digital assistants, pagers, and/or personal computers (PCs). In a representative embodiment of the present invention, an update package used for updating firmware and/or software in a mobile electronic device may comprise a set of executable instructions for converting or transforming a first version of code to a second, updated version of code. Additional details regarding the content and generation of update packages may be found in U.S. Pat. No. 6,832,373, entitled "System and Method for Updating and Distributing Information", issued Dec. 14, 2004, the complete subject matter of which is hereby incorporated herein by reference, in its entirety.

In accordance with a representative embodiment of the present invention, the object ordering tool 107 may employ platform specific information 131 to determine an object ordering information that is subsequently communicated to the generator 109 to facilitate the generation of compact update packages. In a representative embodiment of the present invention, an object ordering tool such as, for example, the object ordering tool 107 may be employed in the processing of an old version of firmware (a.k.a., software, code) and a new version of firmware, to determine a more optimal ordering of code objects. Such information may be employed in creating linker script information used in rebuilding a new image of firmware/software that results in a more compact update package. Such object ordering information may be saved for subsequent use during a later generation activity, when an even more recent version and the new version may be used to generate a more current update package.

In a representative embodiment of the present invention, a generator such as, for example, the generator 109 may employ differencing techniques to compare one version of code (e.g., firmware and/or software), that may be referred to herein as the old version, to another version of the code, that may be referred herein as the new version. The generator 109 may produce difference information that is then compressed and packaged into an update package. The update package may then be delivered to a mobile electronic device using, for example, over-the-air (OTA) messaging techniques.

In a representative embodiment of the present invention, the difference information produced by the generator 109 may be made more compact by reordering at least one code object, module, or component in the new version of firmware/software, to conform to an order determined in the old version of the firmware/software. In one representative embodiment of the present invention, such reordering may occur prior to the generation process conducted by the generator 109. In another representative embodiment of the present invention, such reordering may occur as part of the generation process conducted by the generator 109.

Conventional firmware build procedures, in particular the linking phase, may create firmware binary images that are not appropriate for Over-the-Air (OTA) update techniques. The linker tool used to resolve address references between code object or module may organize firmware content that is optimized for reduced binary image foot print, or for shortest execution time. In doing so, the linker tool may produce a binary image that is sub-optimal for the generation of compact update packages desirable for use in updating the associated mobile electronic device.

Maintaining consistent firmware binary image content between consecutive firmware builds is important for at least the following reasons:

1. generating differencing information comprising the smallest quantity of binary image differences as possible, and
2. minimizing update time by concentrating changes to the fewest number of flash memory sectors.

A representative embodiment of the present invention provides a technique to order code objects in a binary image during the link phase in a fashion that results in a more compact update package, and to maintaining this order through subsequent build procedures.

Figure 2:
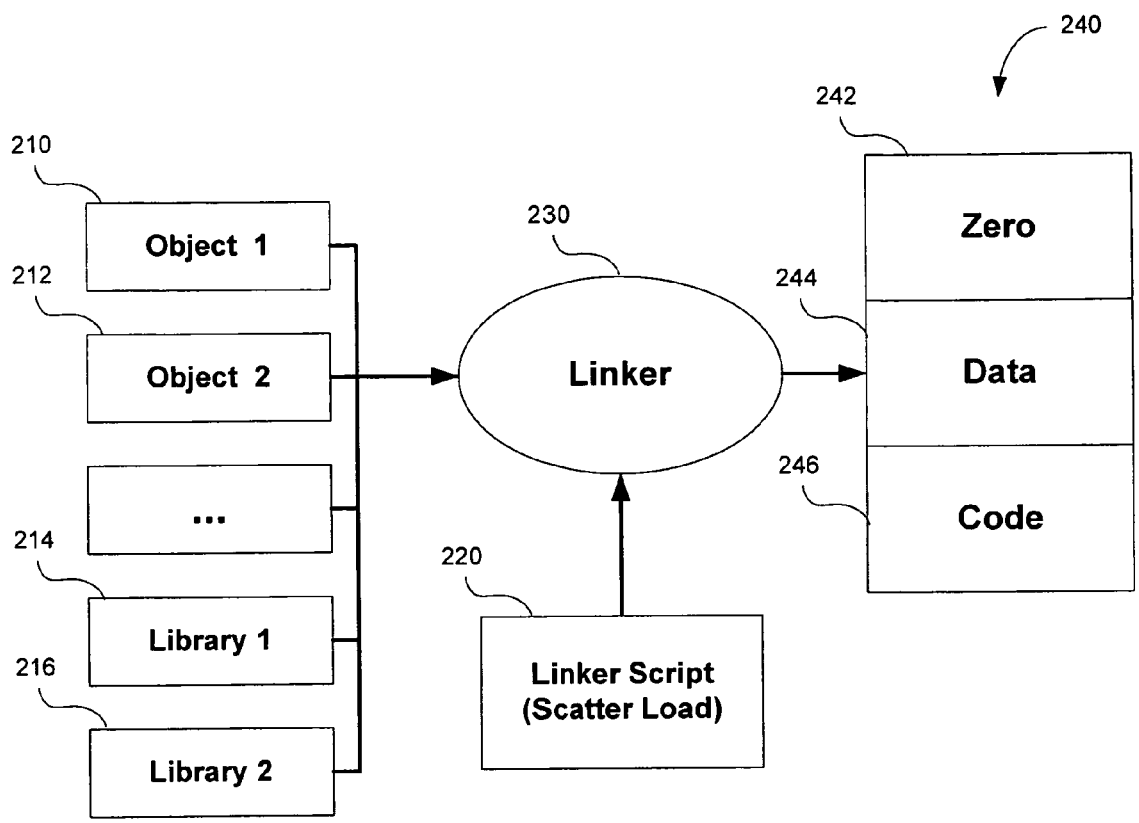
FIG. 2 illustrates the linking of a number of binary object files and code libraries, and a linker script as input to a linking tool to produce a binary image comprising a binary image portion for un-initialized (zero) read/write memory, initialized (data) read/write memory, and executable (code) memory, in accordance with a representative embodiment of the present invention.

FIG. 2 illustrates the linking of a number of binary object files 210, 212 and code libraries 214, 216, and a linker script 220 as input to a linking tool 230 to produce a binary image 240 comprising a binary image portion for un-initialized (zero) read/write memory 242, initialized (data) read/write memory 244, and executable (code) memory 246, in accordance with a representative embodiment of the present invention. Each of the binary object files 210, 212 may comprise a binary image having its own un-initialized (zero) portion, an initialized (data) portion, and an executable (code) portion. The binary object files 210, 212 may be created by compilation of software source code, while libraries 214, 216 may comprise binary archives of containing collections of binary object files, each having their own un-initialized (zero) portion, initialized (data) portion, and executable (code) portion. A typical function of a linker tool such as the linker tool 230 is to combine multiple binary objects and library files, in order to resolve address references between code objects or modules, and to map the location of various code objects to produce a binary image compatible with the memory layout of the target device. In assembling the binary image, the linker tool 230 may rearrange the individual portions of each of the object code files being linked. The linker script 220 may be used by the linker tool 230 to guide the linker tool 230 in the process of creating a binary image 240, by defining the memory layout and rules for mapping the different code objects/object files 210, 212 and libraries 214, 216 onto the memory layout of the target mobile electronic device. The output from the linker tool 230 is normally a binary image object representing the executable firmware as mapped onto the device memory according to the applied rules of the linker script 220.

Figure 3:
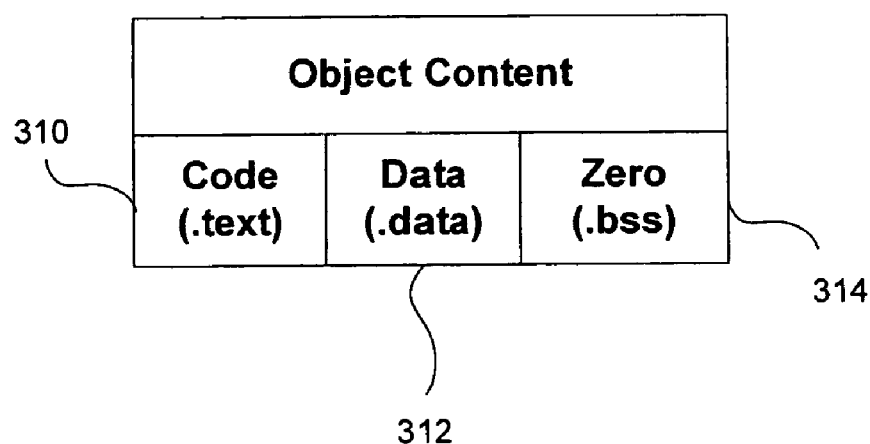
FIG. 3 shows a block diagram illustrating the three components or portions of an object file employed by a linker tool such as, for example, the linker tool of FIG. 2, in accordance with a representative embodiment of the present invention.

FIG. 3 shows a block diagram illustrating the three components or portions of an object file 300 employed by a linker tool such as, for example, the linker tool 230 of FIG. 2, in accordance with a representative embodiment of the present invention. As described above, the object file 300 comprises three portions, a code or executable binary image portion 310, a data or initialized binary image portion 312, and an un-initialized binary image portion 314. Other names may be used to refer to similar portions of an object file, and a different complement of memory portions or segments may be used without departing from the spirit and scope of the present invention. The code or executable binary image portion 310 may comprise executable instructions to be executed by the processor in the mobile electronic device. The data or initialized binary image portion 312 may comprise program storage whose values are defined in the source code from which the object file was generated. The un-initialized binary image portion 314 may comprise program storage whose values were not defined in the source code from which the object file was generated.

Linker scripts that guide linker tool operation such as, for example, the linker script 220 of FIG. 2, are implemented differently for different software development build tools.

FIG. 4A is a listing of an exemplary linker script file describing memory layout and mapping rules for the ARM Developer Studio (ADS), from ARM Ltd., for example object and library binary image files, in accordance with a representative embodiment of the present invention. A linker script file may also be reference to herein as a "scatter file". In the scatter (i.e., linker script) file of FIG. 4A, there are two memory regions into which firmware is to be loaded during transfer of a binary image onto the target mobile electronic device, LOAD_REGION_1 and LOAD_REGION_2. Each loading region is identified with a base address and maximum memory size. In addition, each load region comprises execution regions. The execution regions within each load region describe the remapping of the binary during execution. The illustration of FIG. 4A shows three execution regions EXEC_REGION_1, EXEC_REGION_2, and EXEC_REGION_3 defined within LOAD_REGION_1. The illustration also shows that LOAD_REGION_2 comprises execution regions EXEC_REGION_1 and EXEC_REGION_2. Each execution regions is also identified with base address and maximum size. In addition, object files and libraries can be specified explicitly or implicitly in each execution region.

FIG. 4B is a listing of an exemplary linker script file describing memory layout and mapping rules for the GNU GCC linker, for example object and library binary image files, in accordance with a representative embodiment of the present invention. The memory map of the target processor is described with the MEMORY segment, showing a ROM (i.e., read-only) portion, and a RAM (i.e., read-write) portion, with corresponding ORIGIN (i.e., base addresses) and LENGTH (memory device size) parameters. The code and data layout in the binary image produced by the associated linker tool is mapped according to the rules defined in the SECTIONS segment. The SECTION segment comprises an executable (code) memory portion labeled ".text", an initialized (data) memory portion labeled ".data", and an un-initialized (zero) memory portion labeled ".bss". The organization/arrangement of code objects within a firmware/software binary image is controlled by the linker script or "scatter file". As described above, code object files and libraries may be specified explicitly or implicitly along, with their associated attributes.

In a representative embodiment of the present invention, the organization of code objects within firmware binary image content may follow the following mapping order:

Read only (RO) Code
Read only (RO) Data
Read write (RW) data
Un-initialized or zero initialized (ZI) Data The code portions within objects can be further identified by section. These sections may have unique names which may be used to further refine object ordering.

The linker may automatically generate special content (e.g., special instructions or data sequences) to extend branching range, and/or to change processor state through the creation of a "veneer". The location of this content may be automatically determined by the linker tool.

In a representative embodiment of the present invention, an object ordering tool may be employed to control the order of the objects in the binary image created by a linker tool. The following section describes the details of the tool implementation.

In a representative embodiment of the present invention, a linker script or "scatter file" may be generated by an object ordering tool, from mapping information (e.g., a MAP file) produced by the linker tool. The scatter file may be used as the linker script file when producing the binary image to be employed in generating the update package for updating the target mobile electronic device.

In a representative embodiment of the present invention, the object ordering tool may generate the scatter file using an initial survey of the code objects within a binary image. A linker output file, referred to as a "MAP" file, contains the information used by the object ordering tool. An object listing for a firmware binary image build may be parsed from the MAP file produced by the linker tool used during a firmware build. A MAP file is normally text-based; and its format varies between the linker tools of different build tool chains such as, for example, the GCC and ADS tool chains discussed previously. Therefore, a representative embodiment of the present invention may be capable of parsing MAP files for a variety of different tools chains, and may be capable of generating a scatter file for those same tool chains.

In a representative embodiment of the present invention, Object information extracted from the MAP file may be identified as having the following attributes:
Object name.
Base Address
Object Type, Code, Data, Zero, .data, .text, .bss
Object Attribute, RO, RW, ZI, .data, .text, .bss
Section Name
Parent library
Loading Region
Execution Region Input files to a linker tool such as, for example, the object files 210, 212 and library files 214, 216 used as input to the linker 230 of FIG. 2 may contain detailed information about symbols within the code objects that they represent, and which are used in the building of a binary image for an electronic device. Such symbol information may be used in the creation of binary difference information.

In some representative embodiments of the present invention, the MAP files produced by a linker tool may not explicitly contain symbol information. A representative embodiment of the present invention attempts to uniquely identify binary image content in two separate builds of a firmware. The process of uniquely identifying binary image content within the MAP file may be performed according to the type of information present in the MAP file. In a representative embodiment of the present invention, information about object names, section names, object types and object attributes may be used to identify content for comparison. In some cases, these details may not be sufficient to uniquely identify content. In such situations, duplication may be eliminated by selecting the first occurrence of object information in the MAP file. The remaining object content may be listed automatically by the linker tool in the binary image.

Figure 5:
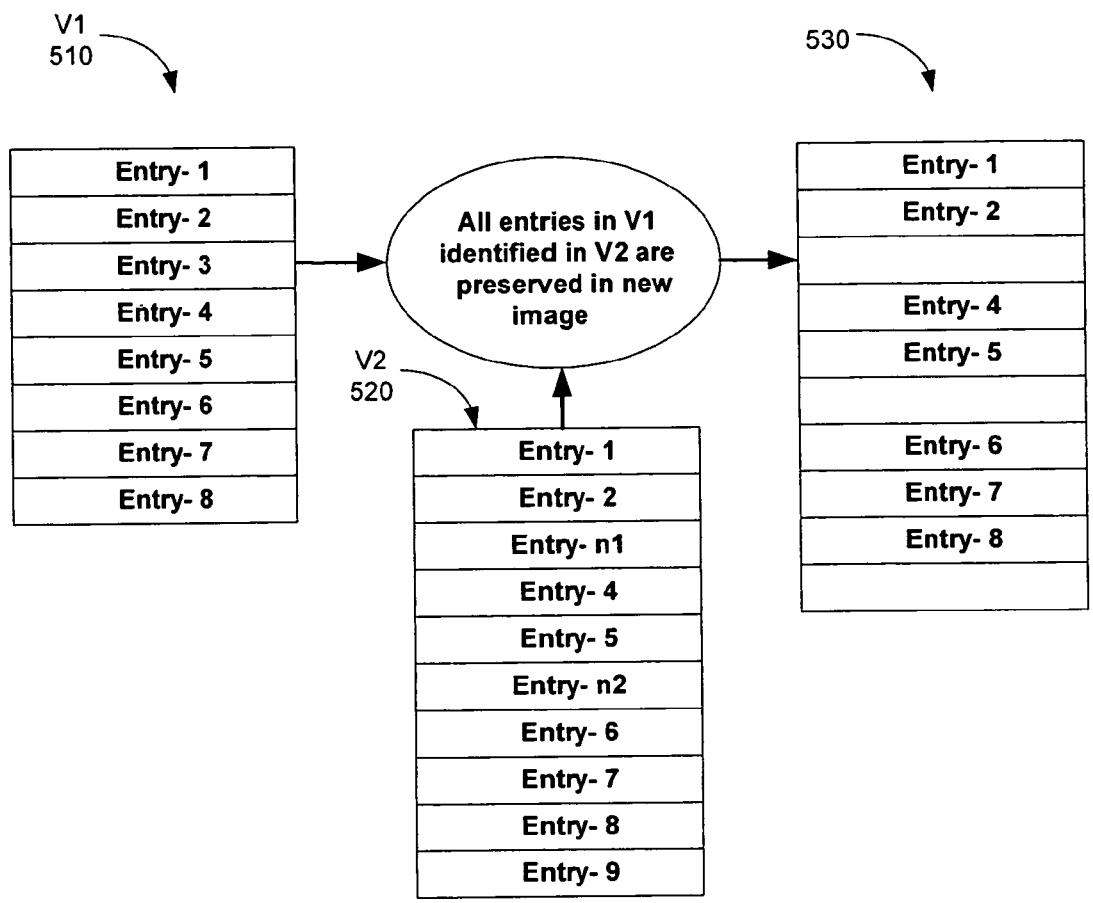
FIG. 5 illustrates an exemplary process of organizing objects to produce consistent firmware images suitable for binary differencing, in accordance with a representative embodiment of the present invention.

FIG. 5 illustrates an exemplary process of organizing objects to produce consistent firmware images suitable for binary differencing, in accordance with a representative embodiment of the present invention. The illustration shows a firmware version 1 V1 510 representing, for example, an existing or old version of firmware/software, for a mobile electronic device, and a firmware version 2 V2 520 representing, for example, a new or updated version of firmware software for a mobile electronic device. The firmware version 1 V1 510 may be processed ("linked") by a linker tool such as, for example, the linker tool 230 of FIG. 2 based upon existing rules, and a corresponding MAP file may be created. The firmware version 2 V2 520 may be processed by the linker tool 230 employing a generic linker script file, to create a corresponding MAP file. The generic linker script may contain minimal instructions to the linker tool, and may rely on the default operating options, parameters, or instruction to the linker tool to create the firmware binary image 530. The purpose of employing such an operating configuration for the linker tool is to survey all objects that are part of the firmware binary image.

A representative embodiment of the present invention may employ a two-phase approach. The illustration of FIG. 5 may represent the first phase, during which MAP files may be parsed and objects lists may be created for each of the firmware versions 1 V1 510 and 2 V2 520. The parsing tool may extract object information, and may list or catalog objects according to their base addresses. Object information entries that are not uniquely identified may be represented by the first entry in the MAP file. The firmware version 2 V2 520 object lists may be used as a baseline, to identify common entries with firmware version 1 V1 510. Objects that are common to both firmware versions may be added to a new, intermediate object list 530.

Figure 6:
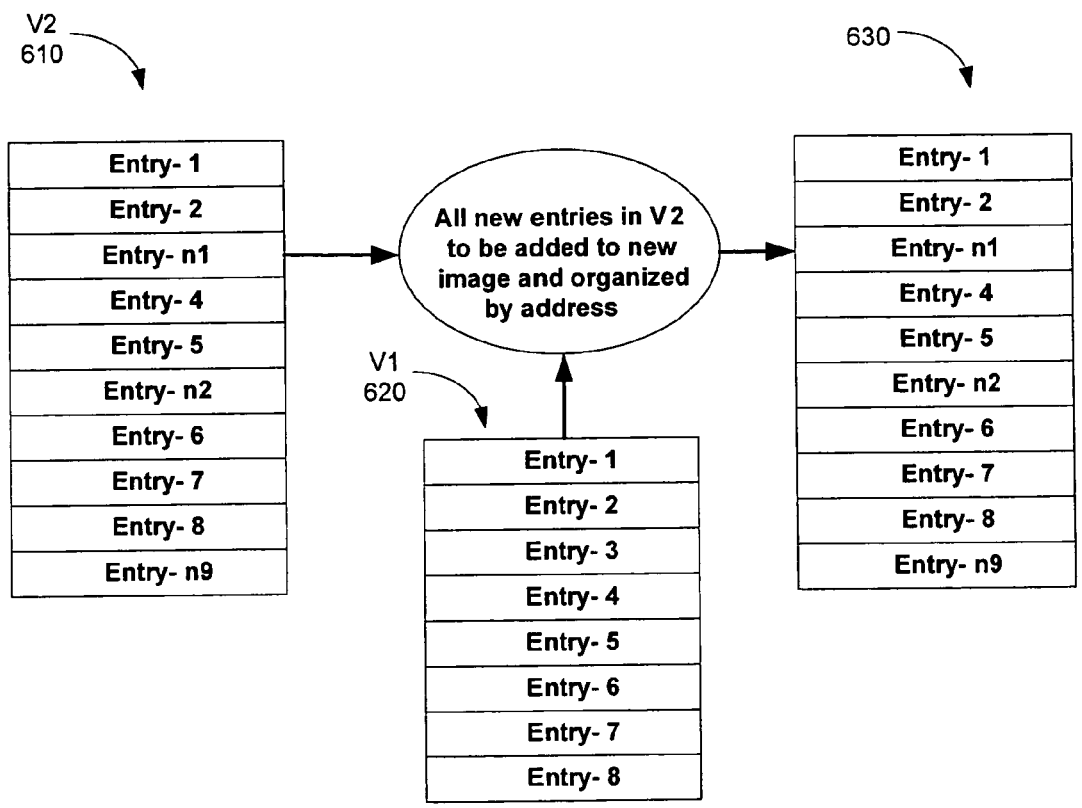
FIG. 6 illustrates a second phase of an exemplary process of organizing objects to produce consistent firmware images suitable for binary differencing, in accordance with a representative embodiment of the present invention.

FIG. 6 illustrates a second phase of an exemplary process of organizing objects to produce consistent firmware images suitable for binary differencing, in accordance with a representative embodiment of the present invention. The illustration of FIG. 6 shows how a comparison of object information may be repeated with a purpose of identifying new objects introduced in the second firmware version. In the illustration of FIG. 6, the objects listed for firmware version 1 V1 620 may be used as the baseline. The objects in the list for firmware version 2 V2 610 that are not present in the list for firmware version 1 V1 620 may be added to the intermediate list 530 of FIG. 5, to create a final object list 630.

The new object list 630 may provide information used to construct a linker script file employed in the building of firmware version 2. In a representative embodiment of the present invention, two approaches may be employed in adding objects to the linker script file.

In the first approach, new objects in firmware version 2 may be added to the linker script file, based upon their base address. This approach may maintain the original linker ordering rules, hence minimizing alteration to the original binary optimization such as, for example, memory space or speed of execution. Such an approach may not be suitable for minimizing the amount of time used in performing an update of the firmware in the mobile electronic device.

A second approach may be employed that concentrates change due to the presence of new objects to a particular region of the firmware binary image. This approach maintains locality of references within individual flash sectors. In a representative embodiment of the present invention, use of this approach may result in all new objects being added at the end of the binary image for a flash sector.

Similar procedure may be applied to object archives such as, for example, libraries, to control ordering of content at the library level.

In a representative embodiment of the present invention, a variety of other objects may automatically be introduced by the linker tool to the firmware binary image. Such objects may include "veneer" code, as well as linker-generated symbols to identify memory regions and memory limits such as, for example, stack and heap memory locations, and RAM and ROM/flash memory boundaries. Veneer code may be created for extending the range of branches, and to change processor state. Such information may be location-critical. Hence, in employing a representative embodiment of the present invention, care may be taken in locating these types of objects within the firmware image.

Figure 7:
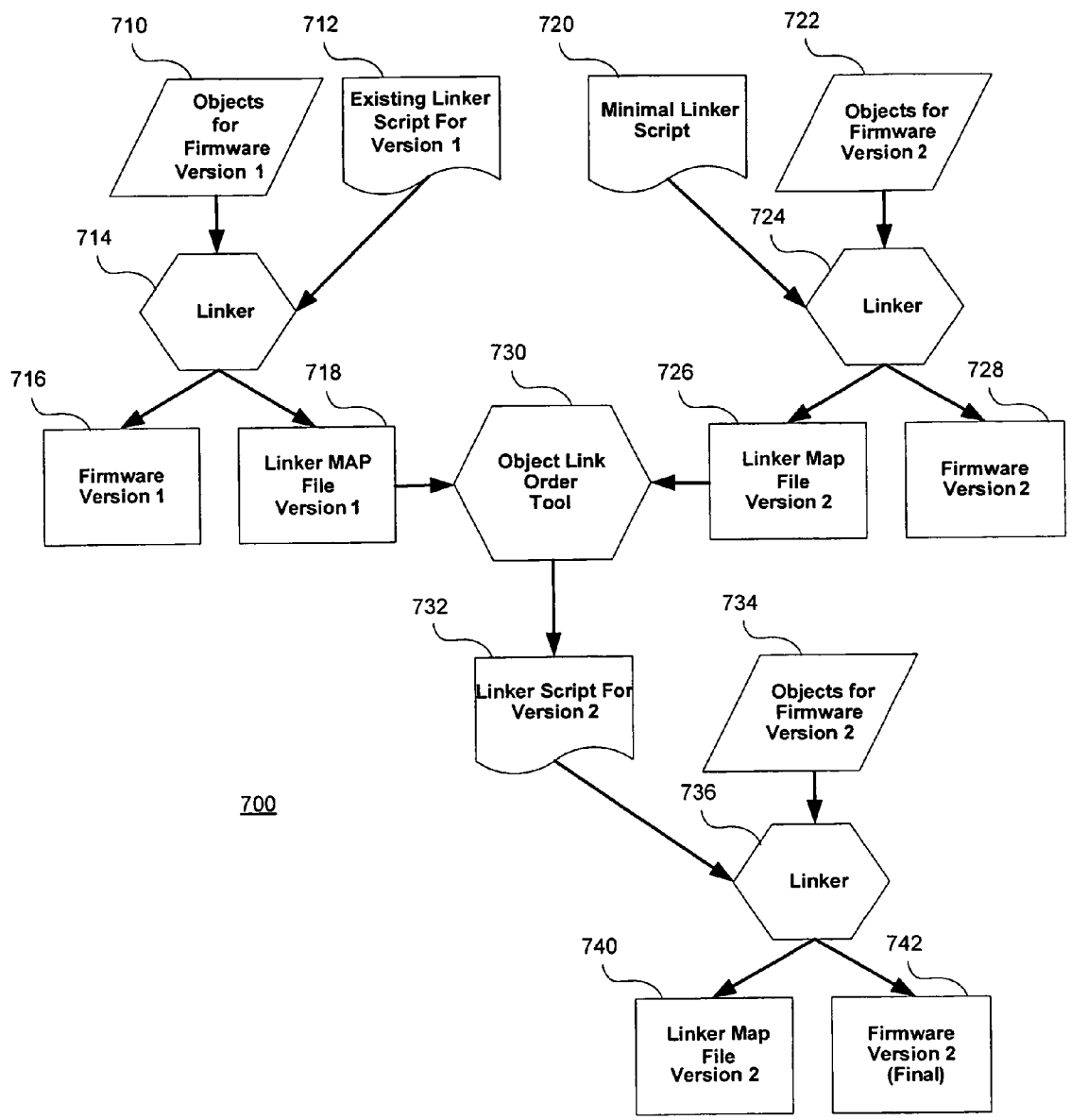
FIG. 7 shows a work flow diagram for a method of using an exemplary object link order tool, in accordance with a representative embodiment of the present invention.

FIG. 7 shows a work flow diagram 700 for a method of using an exemplary object link order tool, in accordance with a representative embodiment of the present invention. The steps of the method and work flow are described as follows. To begin, a linker tool at 714 such as, for example, the linker tool 230 of FIG. 2 may be used to link the objects for firmware version 1 710, using the existing linker script for firmware version 1 712. The linker tool at 714 produces as output firmware version 1 716, and a linker MAP file 718 for firmware version 1. Next, a linker tool at 724 that may, for example, be the same linker tool used at 714, may be used to link object for firmware version 2 722, using a minimal linker script 720. The linker tool at 724 may produce as output firmware version 2 728, and a linker MAP file 726 for firmware version 2.

Next, the linker MAP file 718 for firmware version 1, and the linker MAP file 726 for firmware version 2 are used as input to an object link order tool in accordance with a representative embodiment of the present invention, at 730. As described above, the object link order tool at 730 parses the MAP files 718, 276 for the two firmware versions, and determines an object list for the firmware version 2. The object link order tool then organizes objects according to object base addresses, positioning new object last in the binary image, maintaining locality of objects within flash sectors. Next, The object link order tool at 730 produces as output a new linker script file 732 for the linking of firmware version 2. This new linker script file 732 for firmware version 2 is then input to a linker tool at 736 that may, for example, be the same as the linker tool used at 714 and 724, along with the objects for firmware version 2 734. The linker tool at 736 then links the objects for firmware version 2 734, and produces as output a linker MAP file 740 for firmware version 2, and a firmware version 2 binary image 742. Although not shown, the steps above may be repeated for subsequent builds.

Figure 8:
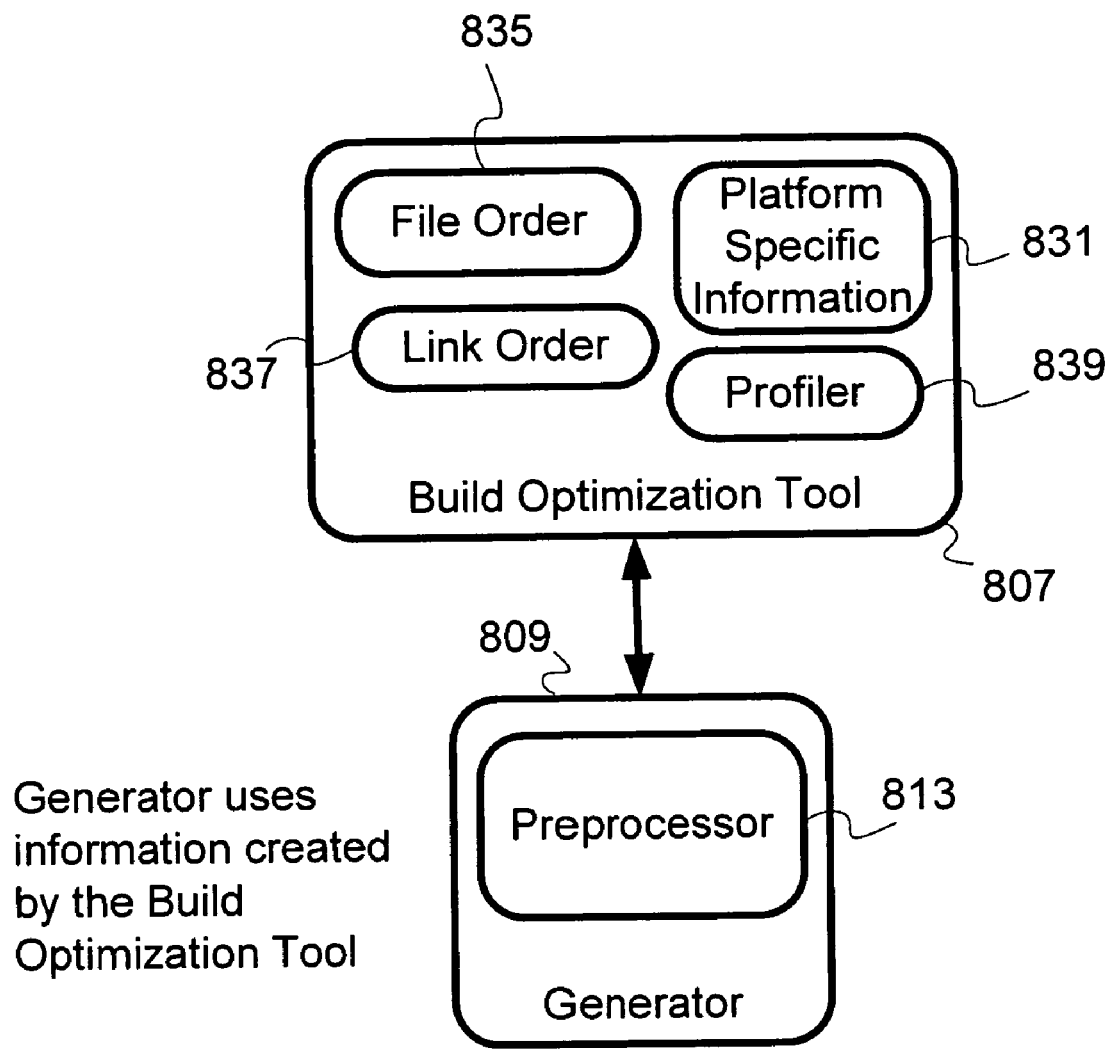
FIG. 8 is a perspective diagram of an exemplary update package generation environment that may correspond to, for example, the update generator of FIG. 1A, in accordance with a representative embodiment of the present invention.

FIG. 8 is a perspective diagram of an exemplary update package generation environment 805 that may correspond to, for example, the update generator 102 of FIG. 1A, in accordance with a representative embodiment of the present invention. The update package generation environment 805 of FIG. 8 employs an object ordering tool 807, also referred herein as a "build optimization tool" (BOT), to maintain an optimized build order of software components or objects for an update package, and a generator 809 to generate the update package used to update an electronic client device such as the electronic client device 104 of FIG. 1A, for example. The object ordering tool 807 and generator 809 may reside on one or more servers in an update distribution system such as the update distribution system 100 of FIG. 1A, for example.

In a representative embodiment of the present invention, object ordering information may be generated using an build optimization tool such as the object ordering tool 807. The object ordering tool 807 may automatically profile a build of an update for an electronic client device such as, for example, the electronic client device 104 of FIG. 1A. Profiling may comprise analysis of the results of previous builds of software/firmware for the electronic client device, software developer input such as, for example, linker directive information, and the contents of libraries of software components or objects. The object ordering tool 807 may employ software-developer-provided linker directives that are made available in a linker directive file. The linker directives may comprise information or directions provided to a software linker such as, for example, the ARM linker component of the ARM development suite (ADS), available from ARM Ltd. Such information may define requirements for the order of linking of software component such as functions and subroutines, the order of files to be provided to, for example, a software linker tool, and the memory locations to be used in a particular build of software/firmware for an electronic client device such as electronic client device 104 of FIG. 1A, for example.

In a representative embodiment of the present invention, an object ordering tool such as the object ordering tool 807 may track and manage both object linking order and file order, in order to produce a compact update package. File order may be managed by the object ordering tool 807 by adjusting the order of filename parameters on a command line invoking a software linker tool, for example. The object ordering tool 807 may analyze a pre-defined linker directive (PLD) file created by a software developer, and may employ build information from prior builds of update packages for the electronic client device (i.e., historical build information) in order to generate object ordering information (e.g., new scripts, command line parameter values, and linker directive information or "scatter load files") that may subsequently be employed by the generator 809 to generate compact update packages. The pre-defined linker directive file may contain directives or keywords intended for an object ordering tool such as the object ordering tool 807. These directives may be interspersed with linker directives for a commercial software linker tool such as, for example, the ARMLink linker tool from ARM Ltd. The directives or keywords may be used to define regions of the build memory space in which certain types of memory is defined to exist. Memory types such as read-only, read-write, and zero initialized are some examples of type that may be used. The order of software components or objects defined to be within a given region of memory may be controlled by an object ordering tool such as, for example, the object ordering tool 807 of FIG. 8. For example, the following three directives or keywords may be used to define regions of memory for read-only, read-write, and zero-initialized memory, respectively:

TABLE

!BOT_RO_SECTION:{prefix} {address} {}
!BOT_RW_SECTION:{prefix} {address} {}
!BOT_RW_ZI_SECTION:{prefix} {address} {}

Listing 1, shown below, is an example of a pre-defined linker directive file that may be employed with a object ordering tool, in accordance with a representative embodiment of the present invention.

TABLE

Listing 1.

```
# Base of ROM - The interrupt vectors must begin at 0x0.
ROM_1 0x0
{
    BB_ROM 0x0
    {
        bootsys.o (BOOTSYS_TEXT, +FIRST)
        bootsys.o (BOOTSYS_DATA)
        boothw.o (+RO)
    }
    BB_RAM 0x010BF000
    {
        dloaduart.o (+RW, +ZI)
```

TABLE-continued

Listing 1.

```
        }
    }
    ROM_2 0x10000
    {
        !BOT_RO_SECTION:MAIN_APP +0 {}
        MAIN_APP_LAST +0
        {
            * (+RO)
        }
        APP_RAM 0x01000000
        {
            * (+RW, +ZI)
        }
    }
```

In a representative embodiment of the present invention, the object ordering tool 807 may employ platform specific information 831, a profiler 839, a file order component 835 and a link order component 837 to determine object ordering information that is subsequently communicated to the generator 809 to facilitate the generation of compact update packages. The platform specific information 831 may comprise, for example, details of the memory configuration of the electronic client device for which an update package is being generated. Such information may include, for example, information defining various regions of memory such as read-only memory, read-write memory, memory that comprises executable instructions (i.e., "code"), initialized memory, un-initialized memory, and the like. Platform specific information such as that represented by platform specific information 831 element of FIG. 8 may be defined by a user of the object ordering tool 807 based upon the hardware specifics of a updatable electronic device such as the electronic client device 104 of FIG. 1A, for example.

In a representative embodiment of the present invention, profiling functionality such as that represented by the profiler 839 may analyze information about a build or series of builds such as, for example, the software components or objects in a build, the order of those objects in an initial build, and the change dynamics for the various software components/objects (e.g., functions, subroutines) in the build to determine optimum placement/ordering of software components/objects in a build of updated firmware. Information used as inputs to the profiler 839 may include the outputs from prior builds including items such as, for example, earlier software/firmware images, software linker output reports, symbol tables/maps, and similar information resulting from prior build activities.

In a representative embodiment of the present invention, file ordering functionality such as that represented by the file order component 835 may manage the processing/command line order of files containing the software components or objects that are assembled to create the software/firmware update generated by the build process. An object ordering tool in accordance with a representative embodiment of the present invention may manage the names and command line order of files used as input to a software linker such as, for example, the ARMLink software linker by ARM Ltd.

In a representative embodiment of the present invention, link ordering functionality such as that represented by the link order component 837 may manage the order in which the software components or objects are linked together to form the software/firmware update generated by the build process.

In a representative embodiment of the present invention, the object ordering tool 807 may automatically and semi-transparently track historical object ordering (HOO) over a number of builds of software/firmware for a particular electronic client device. The user of the object ordering tool 807 may select which build in a series of build activities is to be used by the object ordering tool as a "build reference". A build reference may be used to identify a build to be used in the analysis of difference information, and optimization of a generated update package. Build references may correspond to, for example, those software builds that are performed with the objective to produce update packages that will be distributed into the population of users of the electronic client device, and for which the most optimized update package is desired. In a representative embodiment of the present invention, two types of built references may be used: weight (base) references and order (linking) references. A weight (base) reference may be used in a weight calculation wherein the frequency or likelihood of change in a software component or object is determined. A linking order reference may be used to designate a particular reference order in which software components or objects are assembled in the generated update package.

A representative embodiment of the present invention may employ a historical object ordering rule in which a linking reference has the highest priority in determining the configuration of the generated update package. The use of weight calculations, which determine an estimate of the likelihood of future change in a software component or object may be used as a factor in determining the update package configuration only when weight (base) reference(s) are specified. In a representative embodiment of the present invention, a build optimization tool such as the object ordering tool 807 may calculate a weight by tracking the number of times a selected software component or object of a build changes over a series or sequence of builds. Software components or objects that experience a lower number of occurrences of change between selected build references may be placed closer to the start of the memory space allocated for the build, while those with a higher number of occurrences of change may be placed higher in the memory space. When two software components or objects have equal weight, the software component or object from a library may be selected for first placement in the memory space, and in some representative embodiments, the alphabetical order may be used as a deciding factor. In some representative embodiments of the present invention, the order of a software component or object in the build may be controlled through the use of object level information.

In a representative embodiment of the present invention, a build optimization tool such as the object ordering tool 807 may process an original/old/first version/image of software/firmware and an updated/new/second version/image of software/firmware. After determining appropriate ordering information for the components or objects in the build, the object ordering tool 807 may rebuild the new image of firmware using appropriate (i.e., optimized) object ordering information. To determine an appropriate (i.e., optimized) object ordering for components in the new image, an object ordering tool in a representative embodiment of the present invention may, for example, retrieve an object order for the original/old/first version/image from a database, if that information has been previously stored or uploaded. Otherwise, the object order for the original/old/first version/image may be determined by analyzing the original/old/first version/image.

A build optimization tool such as, for example, the object ordering tool 807 of FIG. 8 may accept a number of command-line options and parameters. Some possible command line options and parameters are shown below in Table 1.

TABLE 1

| | |
|---|---|
| -botn | Assigns the filename of the build optimizer tool profile |
| -botl | Specifies the name of the software linker tool to be used |
| -botloff | Requests that the linker be bypassed |
| -boto | Specifies the prior build version that the build optimization tool will use as the linking order reference |
| -botb | Specifies the prior build version that the build optimizer tool will use as the historical reference to determine the object order |
| -botson | Requests that symbol profiling be turned on |
| -botlog | Specifies the filename of the built optimizer tool log file |
| -botgl | Requests that linker directive generation be performed |
| -botgln | Specifies the filename of the build optimizer tool generated linker directive (GLD) file |

A build optimization tool in accordance with a representative embodiment of the present invention may allow and disallow certain combinations of command line options and parameters. A exemplary listing of possible combinations of options and parameters is shown in Table 2, below. In the illustration of Table 2, the entry "X" indicates that the combination of requested actions is not consistent, and the "(none)" indicates that no parameters are used. If the option "-botgl" is selected, the pre-defined linker file may be defined by a scatter load file. The generated linker directive file output filename may be defined by the "-botgln" option, if that option is present. If no GLD filename is specified, the build optimizer tool may use a default filename with a suffix of ".gld".

TABLE 2

| Requested Actions | | | |
|---|---|---|---|
| GLD | Perform Linking | Profile | Option(s) |
| Yes | No | No | -botgl -botloff |
| Yes | Yes | No | X |
| Yes | No | Yes | X |
| No | Yes | Yes | (null) |
| No | No | Yes | -botloff |
| Yes | Yes | Yes | -botgl |
| No | Yes | No | X |
| No | No | No | X |

Some representative embodiments of the present invention may include functionality to handle what may be referred to as a "veneer boundary problem", that may occur when a target processor is unable to execute instructions that specify direct jumps to any location within the processor address space. In such a case, a separate location within a limited distance from the jump instruction may be used to provide an indirect jump address. To manage such an issue, a representative embodiment of the present invention may group software components or objects within a 64K byte address region. In such an embodiment, the actual linking order of the software components or objects may be dependent upon file order.

Figure 9:
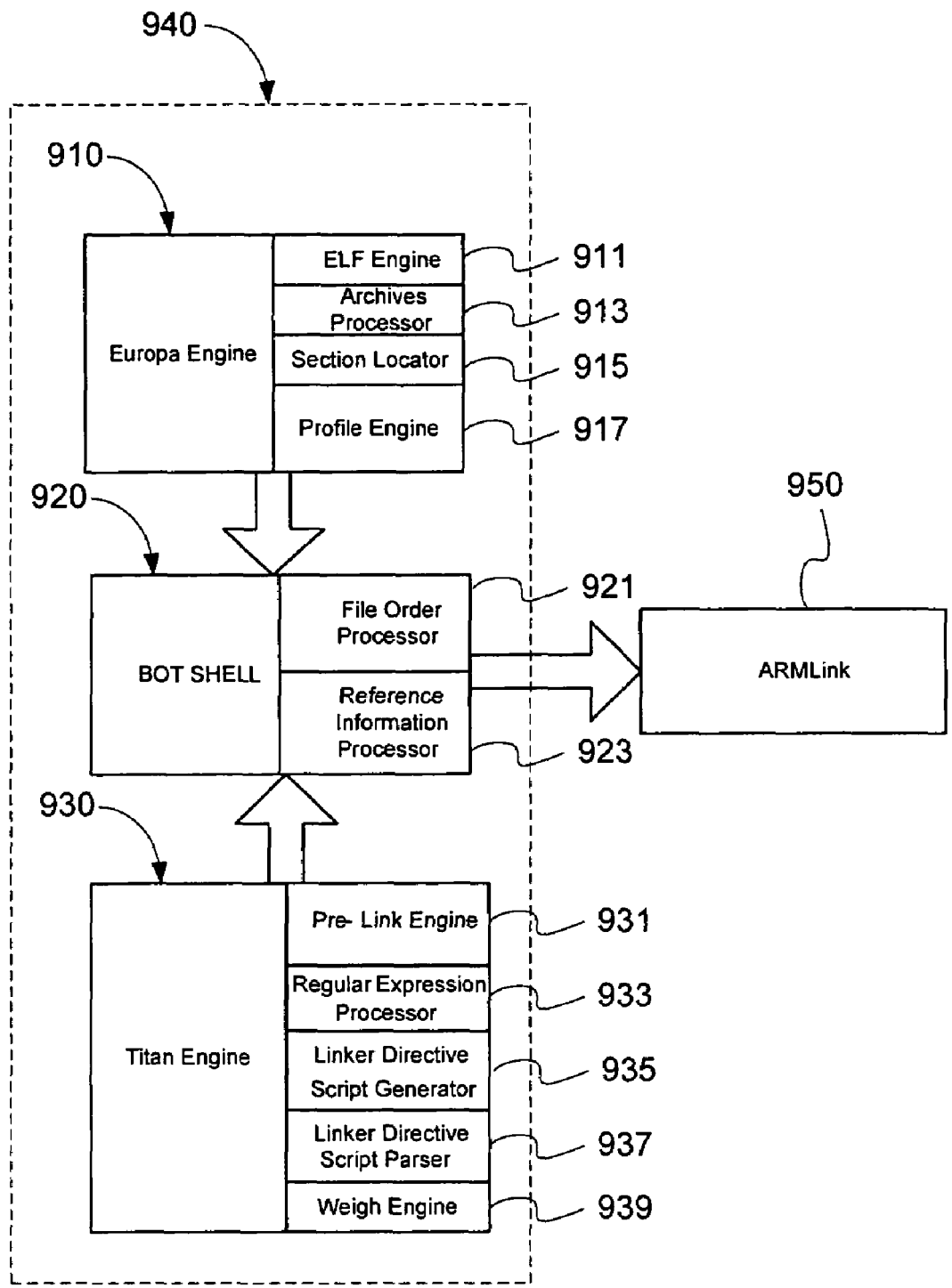
FIG. 9 is a block diagram showing additional details of an exemplary build optimization tool that may correspond to, for example, the build optimization tool of FIG. 8, in accordance with a representative embodiment of the present invention.

FIG. 9 is a block diagram showing additional details of an exemplary build optimization tool 940 that may correspond to, for example, the build optimization tool 807 of FIG. 8, in accordance with a representative embodiment of the present invention. As shown in FIG. 9, the build optimization tool 940 of FIG. 9 comprises a transparent linker profiler tool 910, a build optimizer shell 920, and a pre-link engine 930, that employ a commercial software linking tool such as, for example, the ARMLink software linker from ARM Ltd. to optimize the assembly of the software components or objects of a build into a compact update package, using pre-defined linker directives, prior build information, and software library files.

In a representative embodiment of the present invention, the transparent linker profiler tool 910 may comprise an executable and linkable file format (ELF) engine 911 for the processing of ELF files, an archives processor 913, a section locator 915, and a profile engine 917.

In a representative embodiment of the present invention, the build optimizer shell 920 of FIG. 9 may comprise a file order processor 921 and a reference information processor 923. The file order processor 921 may manage the order of input files to a software linking tool such as, for example, the ARMLink linker tool 950 in FIG. 9. This may include the determination of file order information from prior builds, and the formation of file order information for use by a software linking tool such as the ARMLink linker tool 950. The reference information processor 923 may process prior build information and input from a user of the build optimization tool, to derive historical object ordering information and file order information.

In a representative embodiment of the present invention, the pre-linking engine 930 may comprise a pre-link engine 931, a regular expression processor 933, a linker directive script generator 935, a linker directive script parser 937, and a weight engine 939. The regular expression processor 933 may be employed for the evaluation of regular expressions used in linker directive files, for example.

In a representative embodiment of the present invention, the linker directive script generator 935 may be employed to create properly formatted linker directive information for use as input to a software linker during the actual linking of software components or objects in the building of an update package. An example of a linker directive (i.e., script) file is shown in FIG. 4A. This linker directive information may be based upon information derived from the analysis of pre-defined linker directive information provided by a user of the build optimization tool 940, and historical build information from prior builds of the desired software/firmware, for example.

In a representative embodiment of the present invention, the linker directive script parser 937 may be employed to disassemble or extract information and parameters in a prior build optimizer tool-generated or user defined linker directive file, such as the pre-defined linker directive file shown in Listing 1, above. As described above, linker directive or "scatter load" files may define the names, types, and locations in the memory address space for which a build is being produced. The linker directive script parser 937 may extract user-defined information about the desired configuration of a build from a pre-defined linker directive (PLD) file, or information from a build optimizer tool-generated linker directive (GLD) file produced by use of the build optimizer tool.940 during a build of an earlier version of software/firmware.

In a representative embodiment of the present invention, the weight engine 939 may identify corresponding software components or objects appearing in builds of an update package, and may determine the frequency and/or probability of change in each software component or object, in a series of build activities. A representative embodiment of the present invention may determine corresponding software components and objects between two reference builds, using filenames. The weight engine 939 may measure change in a binary fashion between builds. That is, the presence of one difference or 100 differences between corresponding software components or objects in a pair of builds may be viewed as a single change. In this fashion, a given software component or object that, over a series of five builds, for example, contains changes from the immediately previous version three times, may be assigned a weight of three. All changes occurring in corresponding software components or objects between two reference builds may be included in the computation of weight, whether or not any intermediate builds are ever distributed to the target population of electronic client devices. Such weight information may be used to predict the likelihood of future changes to the identified software components or objects, allowing the build optimizer tool 940 to assign to the most frequently changing software components, memory space allocations that will result in the least impact on size of a later build of the software/firmware. For example, if during the linking process memory is allocated from a particular initial memory address, placing more stable software components nearest the starting address of the allocated memory addresses will result in fewer changes in address assignments in a later build from that of a prior build, and therefore a smaller update package.

Figure 10:
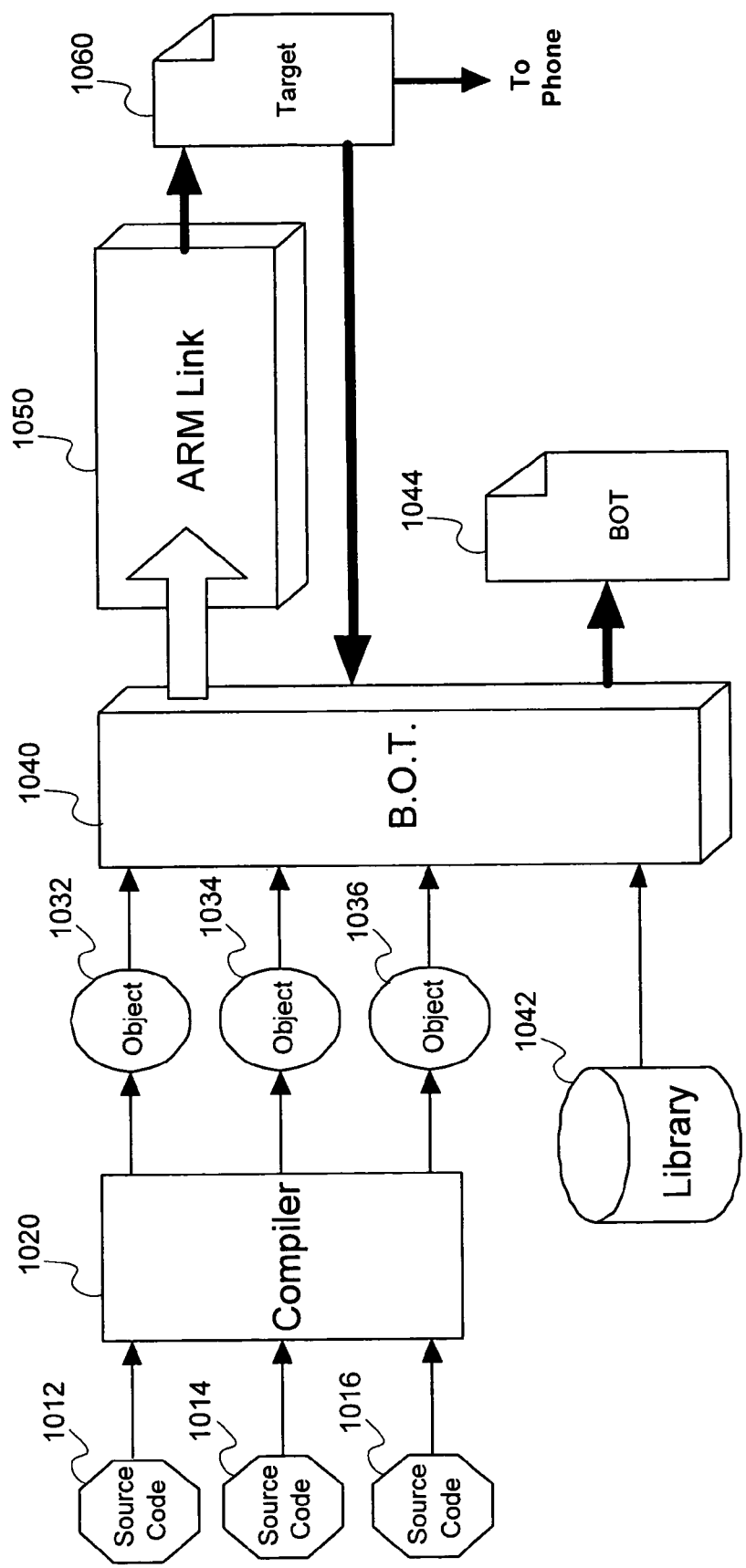
FIG. 10 is a block diagram showing an exemplary build environment that employs a build optimization tool that may correspond to, for example, the build optimization tool of FIG. 9, in accordance with a representative embodiment of the present invention.

FIG. 10 is a block diagram showing an exemplary build environment 1000 that employs a build optimization tool 1040 that may correspond to, for example, the build optimization tool 940 of FIG. 9, in accordance with a representative embodiment of the present invention. The build environment 1000 may reside on a personal computer or server for use by developers of software and/or firmware for electronic client devices such as the electronic client device 104 shown in FIG. 1A, for example. As illustrated in FIG. 10, the build environment 1000 comprises a compiler 1020 that may, for example, be a compiler for any of a variety of high-level programming languages including the "C" programming language. In other representative embodiments, the compiler 1020 may represent an assembly language tool for processing assembly language source code. In either case, the compiler 1020 may be employed to compile source code files 1012, 1014, 1016 containing various software components and objects, to produce object code files 1032, 1034, 1036. The object codes files may make reference to software components and objects contained within a library 1042. The object codes files 1032, 1034, 1036 and library 1042 may be suitable for processing by a software linker tool such as, for example, the ARMLink software linker available from ARM Ltd.

In a representative embodiment of the present invention, the object code files 1032, 1034, 1036, and library files 1042 may be analyzed by a build optimization tool 1040 to determine an optimized linking arrangement to produce a compact software/firmware update for an electronic client device such as, for example, the electronic client device 104 of FIG. 1A. As described above, in various representative embodiments of the present invention, the electronic client device 104 may comprise, for example, a cellular phone, a pager, a personal digital assistant, or other electronic device capable of accepting software/firmware updates. Such devices typically have limited resources such as memory, battery power, and data communication speeds, and software/firmware updates of reduced size, as produced using a representative embodiment of the present invention, are highly desirable. By managing the order in the build of software components or objects that make up the finished software/firmware update, the volume of differencing information needed to transform a previous or old code version to a new or updated code version may be minimized, and the size of the corresponding update package to be distributed to the electronic client device kept to a minimum.

In a representative embodiment of the present invention, an object ordering tool such as the build optimization tool 1040 of FIG. 10 may generate information, scripts, parameters, and the like to control the behavior of an existing commercially available or proprietary software linker tool, such as the ARMLink software linker from ARM Ltd., that is shown in FIG. 10 as the ARMLink linker 1050. Although the discussion herein makes repeated reference to the ARMLink product of ARM Ltd., representative embodiments of the present invention may employ any of a variety of software linker tools to perform the optimization functions described herein, without departing from the scope of the present invention. The linked build output for the target 1060 from the software linker (e.g., ARMLink 1050) may then be processed for distribution to an electronic client device. The build optimization tool 1040 may create one or more build optimization tool information files 1044 containing, for example, build reference information, symbol table information, software component or object information, to name just a possible few items. The target build 1060, and build optimization tool information 1044 may later be used by an object ordering tool such as the build optimization tool 1040, as a input in the generation of a later build of an update for the electronic client device.

Figure 11:
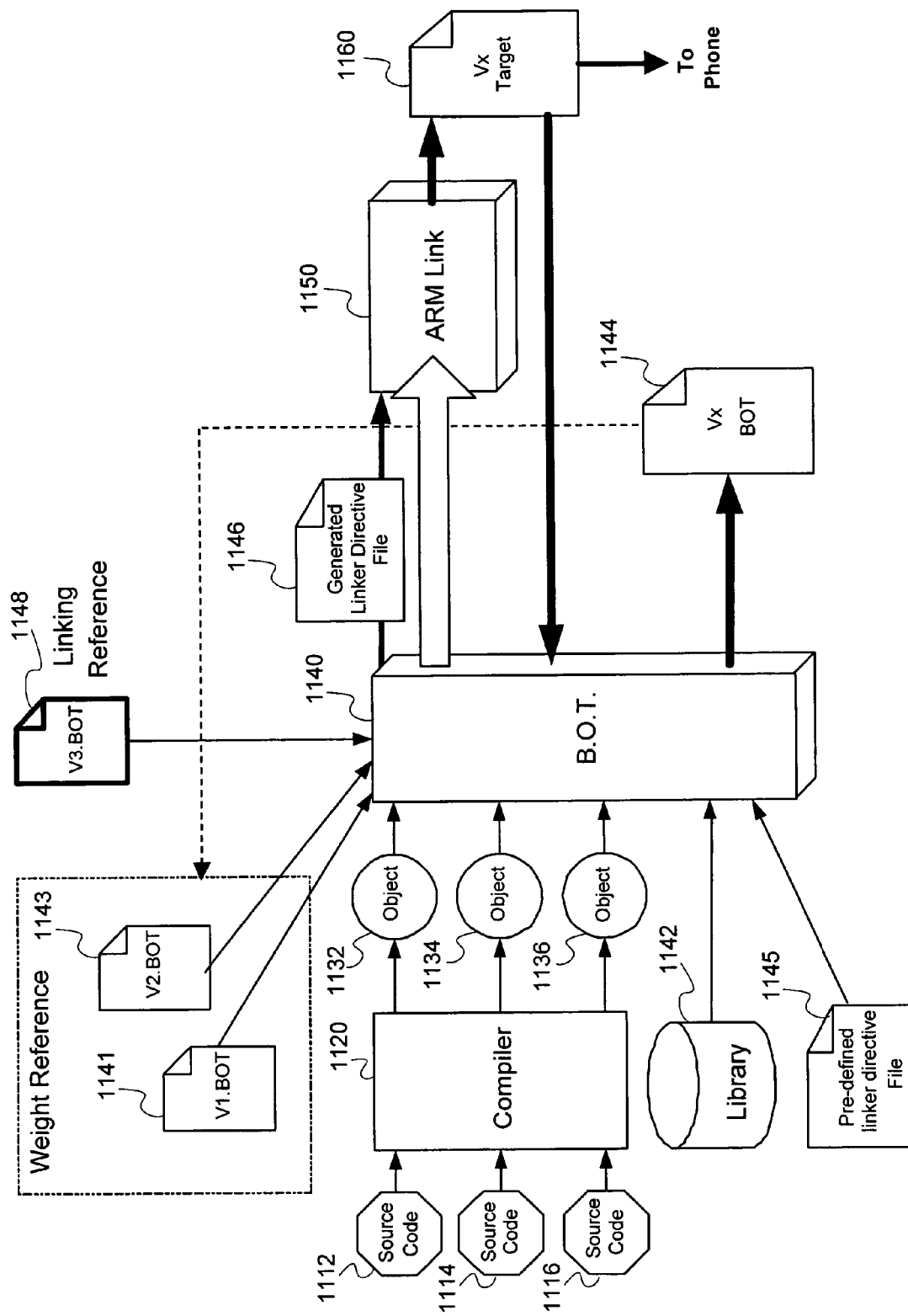
FIG. 11 is a block diagram showing an exemplary build environment that employs a build optimization tool that may correspond to, for example, the build optimization tools of FIGS. 9 and 10, in accordance with a representative embodiment of the present invention.

FIG. 11 is a block diagram showing an exemplary build environment 1100 that employs a build optimization tool 1140 that may correspond to, for example, the build optimization tools 940, 1040 of FIGS. 9 and 10, in accordance with a representative embodiment of the present invention. The illustration of FIG. 11 shows additional detail of the operating environment and use of an order optimization tool such as the build optimization tool 1040 of FIG. 10. The build environment 1100 may reside on a personal computer or server for use by developers of software and/or firmware for electronic client devices such as the electronic client device 104 shown in FIG. 1A, for example. As shown in FIG. 11, the build environment 1100 comprises source code files 1112, 1114, 1116, a compiler 1120, object code files 1132, 1134, 1136, a library 1142, and software linker tool 1150, that may correspond to, for example, the compiler 1020, source code files 1012, 1014, 1016, object codes files 1032, 1034, 1036, the library 1042, and software linker tool 1050, of FIG. 10. The compiler 1120 may be, for example, a compiler for any of a variety of high-level programming languages, or an assembly language tool for processing assembly language source code. The compiler 1120 may compile source code files 1112, 1114, 1116 to produce object code files 1132, 1134, 1136. The object codes files may make reference to software components and objects within library 1142. The object codes files 1132, 1134, 1136 and library 1142 may be compatible with a software linker tool such as, for example, the ARMLink software linker available from ARM Ltd., shown in FIG. 11 as ARMLink 1150. As stated above, although the discussion of the present application makes reference to the ARMLink software linker of ARM Ltd., the use of this particular tool is not a specific limitation of the present invention. Representative embodiments of the present invention may employ other software linker tools in the performance of the functions described herein, without departing from the scope of the present invention.

As illustrated in FIG. 11, a representative embodiment of the present invention may employ a pre-defined linker directive (PLD) file 1145, an example of which is shown above in Listing 1, to communicate build information from the developers of the software/firmware update. The build optimization tool 1140 may profile the object code files 1132, 1134, 1136 and library 1142, and may employ weight reference information 1141 and 1143, and linking reference information 1148 to produce version build information file 1144, generated linker directive file 1146, that may be passed to a software linker tool 1150 such as the ARMLink software linker by ARM Ltd. The software linker tool 1150 may used to link the software components and objects that make up the desired version of target software/firmware 1160, to be distributed to the associated electronic client devices. The version build information file 1144 may be employed by the build optimization tool 1140 during a later build of a subsequent software/firmware update version. While the pre-defined linker directive file 1145 may contain both directives and/or parameters for the build optimization tool 1140, the generated linker directive file 1146 output by the build optimization tool 1140 is arranged to contain only directives and/or parameters understood by the software linker tool 1150.

In this manner, a representative embodiment of the present invention profiles information resulting from prior software/firmware builds, and directives from a user wishing to build a new version of software/firmware, and generates new linker directive information, command line parameters, scripts, and/or other information used in employing a software linker tool to build a new version from an updated set of software components or objects in a manner that minimizes the size of the update information (i.e., update package) to be distributed to an electronic client device.

Figure 12:
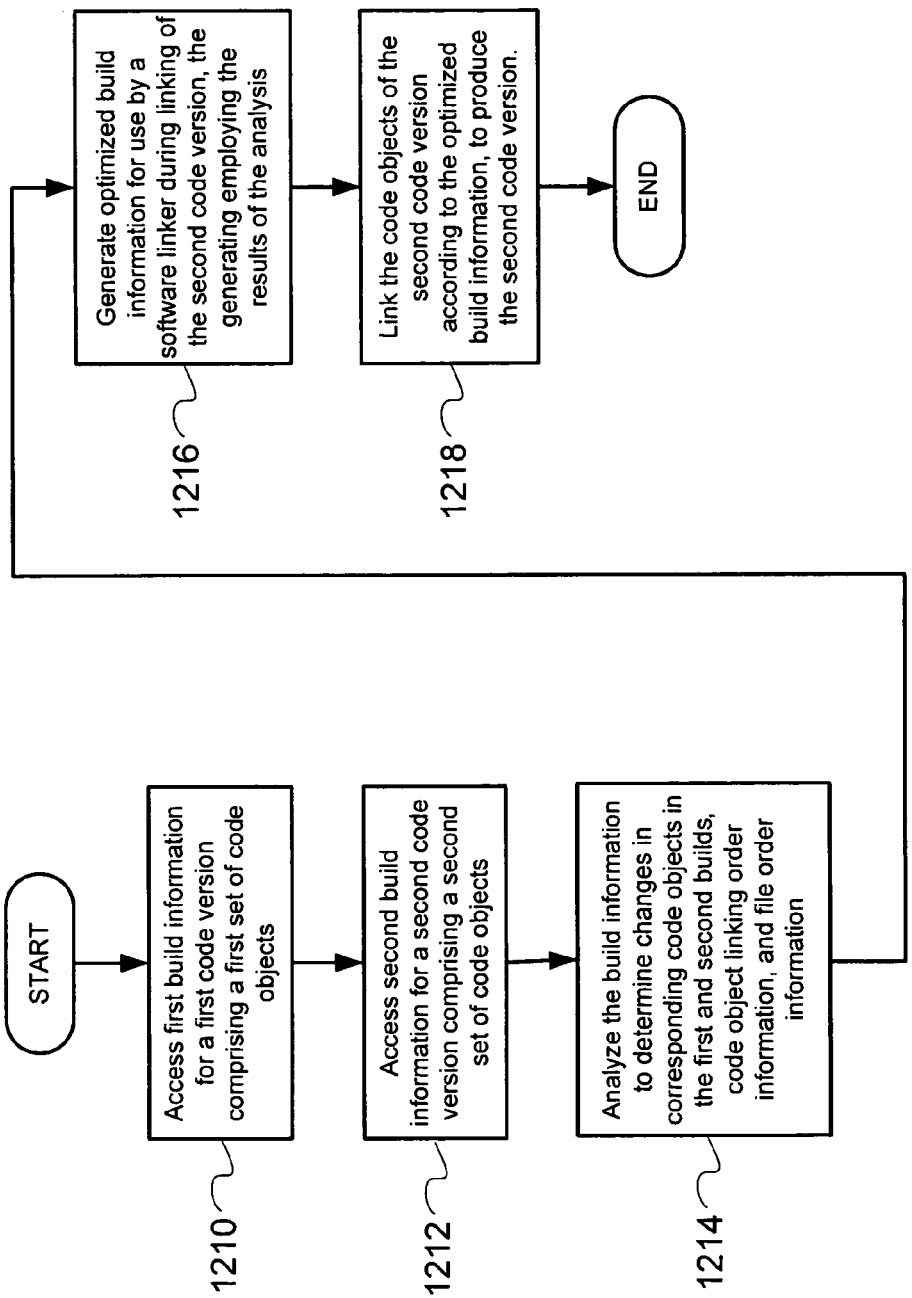
FIG. 12 is a flowchart of an exemplary method of generating optimized update information for converting, in an electronic client device that may correspond to, for example, the electronic client device of FIG. 1A, a first code version to a second code version, in accordance with a representative embodiment of the present invention.

FIG. 12 is a flowchart of an exemplary method of generating optimized update information for converting, in an electronic client device that may correspond to, for example, the electronic client device 104 of FIG. 1A, a first code version to a second code version, in accordance with a representative embodiment of the present invention. The first and second code versions may comprise, for example, code objects linkable using a software linker. The method of FIG. 12 may be implemented as machine readable code on a personal computer or server, for example. The method begins by accessing a first set of build information for a first code version (block 1210). Next, a second set of build information for a second code version may be accessed (block 1212). The build information accessed may be, for example, for particular builds of firmware/software for the electronic client device, that have been identified as build references for example. The method may continue by analyzing the build information for the first and second code versions (1214). The analysis may determine the occurrence of changes in corresponding code objects between the first and second builds, such as by determining that a given code object that appears in an earlier (first) build also appears in a later (second) build with some changes in the code. Those changes may, in fact, occur gradually over a series of builds for which the earlier (first) build and later (second) builds have been designated as build references. A weight may be computed to represent the frequency of change between builds. The analysis may also determine code object linking order information, indicating the order of code objects in the linked first and/or second code versions. In addition, the analysis may determine file order information representing the sequence in which files containing code object and/or libraries are provided to a software linker tool used to perform the linking of a build.

A representative embodiment of the present invention may then generate optimized build information for use by a software linker during linking of the second code version (block 1216). A suitable software linker for use with an ARM RISC processor may include, for example, the ARMLink software linker from ARM Ltd. Other software linker tools may be employed, depending upon the processor used in the electronic client device. The generation of the optimized build information may employ the results of the analysis. The method of FIG. 12 may then proceed by linking the code objects of the second code version according to the optimized build information (block 1218). The output from the linker is an optimized second code version, which through the analysis of historical information from prior builds, and adaptation of build processes and parameters, is optimized to produce a compact package of update information for the electronic client device, when differences between the first and second code versions are encoded. A representative embodiment of the present invention may also comprise generating optimized update information using the first code version and the second code version, where the optimized update information is used by the electronic client device to update the electronic client device to the second code version using the first code version.

Figure 13:
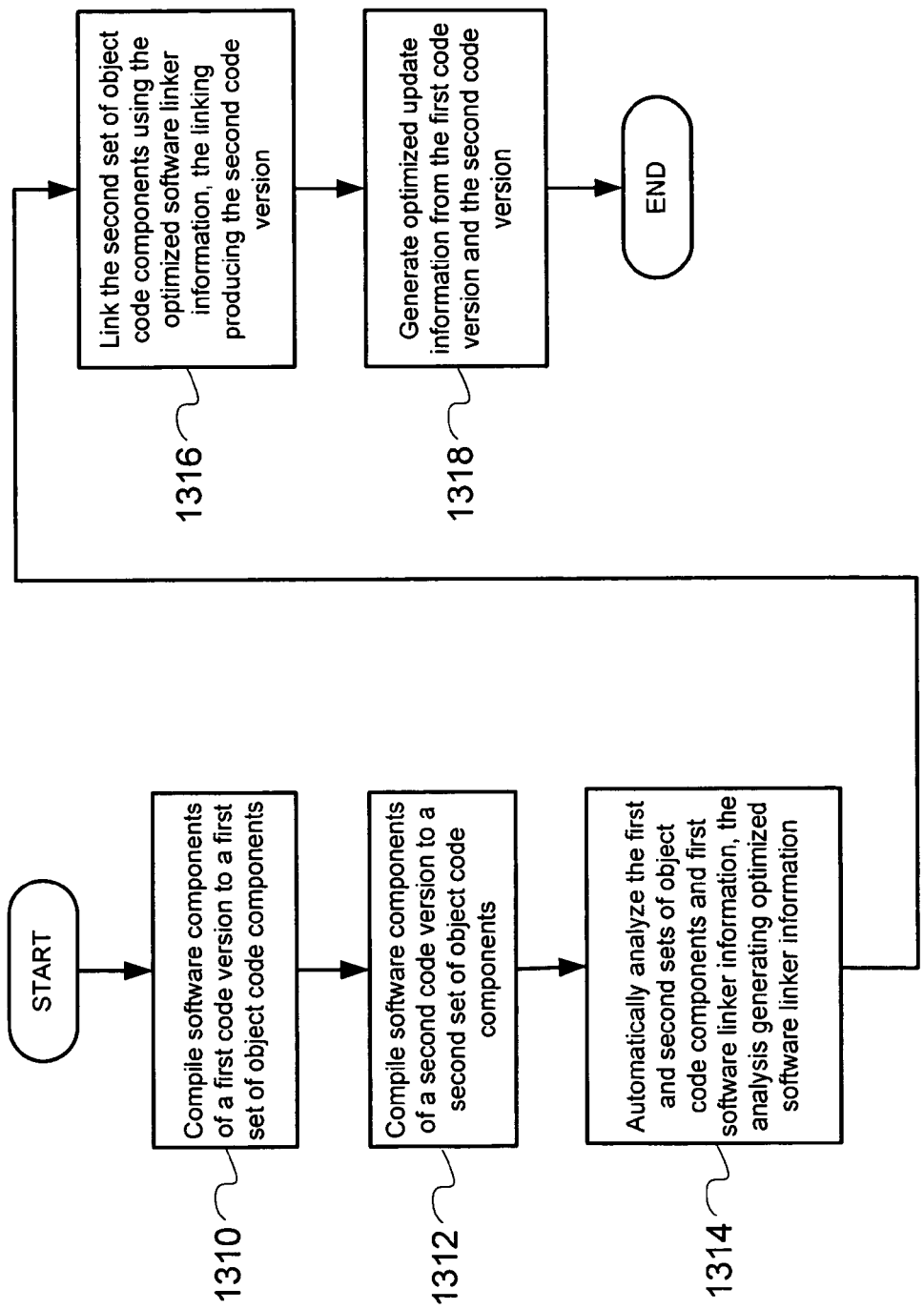
FIG. 13 is a flowchart of an exemplary method of generating optimized update information for converting, in an electronic client device that may correspond to the electronic client device of FIG. 1A, for example, a first code version to a second code version, in accordance with a representative embodiment of the present invention.

FIG. 13 is a flowchart of an exemplary method of generating optimized update information for converting, in an electronic client device that may correspond to the electronic client device 104 of FIG. 1A, for example, a first code version to a second code version, in accordance with a representative embodiment of the present invention. The method of FIG. 13 may be implemented as machine readable code on a personal computer or server, for example. As shown in the example of FIG. 13, the method may involve compiling software components of a first code version to a first set of object code components (block 1310), and compiling software components of a second code version to a second set of object code components (block 1312). The method of FIG. 13 may then automatically analyze the first and second sets of object code components and first software linker information (block 1314). The analysis in a representative embodiment of the present invention may generate optimized software linker information, that may then be used in linking the second set of object code components (block 1316). The linking may produce the second code version, and the method may proceed to generate optimized update information from the first code version and the second code version (block 1318).

Figure 14:
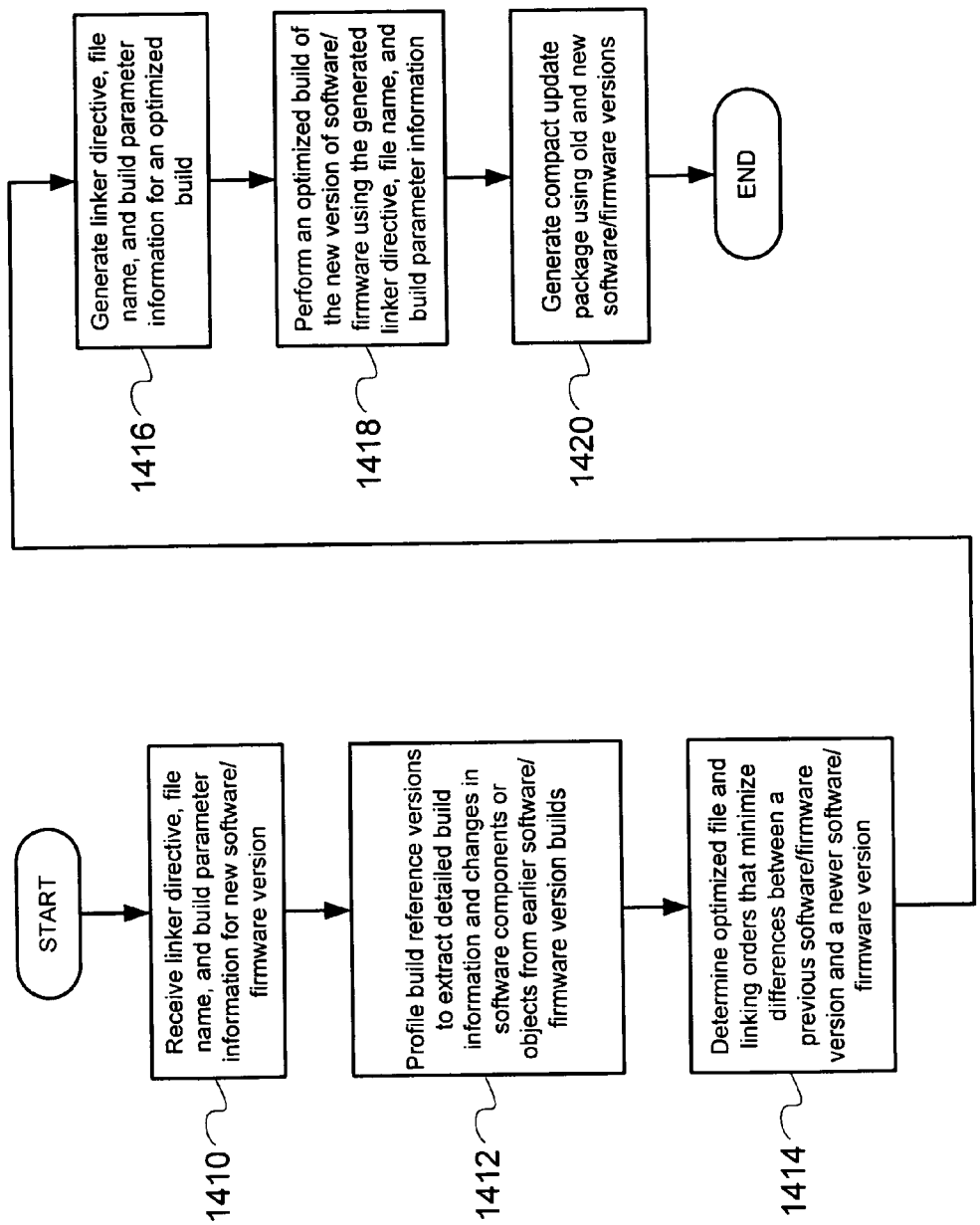
FIG. 14 is a flowchart of another exemplary method of generating optimized update information for converting, in an electronic client device that may correspond to the electronic client device of FIG. 1A, for example, a first code version to a second code version, in accordance with a representative embodiment of the present invention.

FIG. 14 is a flowchart of another exemplary method of generating optimized update information for converting, in an electronic client device that may correspond to the electronic client device 104 of FIG. 1A, for example, a first code version to a second code version, in accordance with a representative embodiment of the present invention. The method of FIG. 14 illustrates that a processor such as, for example, a personal computer or server may receive linker directive, file name, and build parameter information for new software/firmware version (block 1410). Such information may be provided by, for example, a developer/user that is building a new software/firmware release for the electronic client device on a command line or in a parameter file. The method may then profile build reference versions to extract detailed build information and changes in software components or objects from earlier software/firmware version builds (block 1412). Next, the method may determine optimized file and linking orders that minimize differences between a previous software/firmware version and a newer software/firmware version (block 1414). The method may then generate linker directive, file name, and build parameter information for an optimized build (block 1416). Next, the method may perform an optimized build of the new version of software/firmware using the generated linker directive, file name, and build parameter information (block 1418). The method may then generate a compact update package using the old and the new software/firmware versions (block 1420).

Aspects of the present invention may be found in a system for generating updating information for updating code in an electronic device. Such a system may comprise a server having stored thereon a first binary memory image comprising a first plurality of code objects, and object ordering software executable on the server, the object ordering software capable of determining an object order in which the first plurality of code objects occur in the first binary memory image. The system may also comprise generator software capable of generating difference information using the first binary image. The generator may employ the object order and the difference information in generating the updating information. The first plurality of code objects may comprise at least one of: a shared library, a component of the shared library, a device driver, a function, a subroutine, a compiled C module, a block of code, and a file. The system may also comprise a second binary memory image comprising a second plurality of code objects, the object ordering software processing the second binary image and the object order to determine a changed object order, the object ordering software reordering the second plurality of code objects based on the changed object order, and generating a reorganized second binary memory image, and the generator processing the first binary image and the reorganized second binary image in generating the difference information.

In a representative embodiment of the present invention, the system may also comprise linking software that is used to create the reorganized second binary image based on the changed object order and the second plurality of code objects, where the generator processes the first binary image and the reorganized second binary image to generate the difference information. The linking software may link code objects that are determined to have moved between the first binary memory image and the second binary memory image, in order to generate the reorganized second binary image. The linking software may link the second plurality of code objects based on the object order, to generate the reorganized second binary image. The linking software may link the second plurality of code objects based on the changed object order, to generate the reorganized second binary image. The object ordering software may store a copy of the object order as a stored object order that can be subsequently retrieved, and the object ordering software may process the second binary image and the stored object order to determine the changed object order. The object ordering software may employ linking software to link the second plurality of code objects and create a reorganized second binary image based on the changed object order, and the generator may process the first binary image and the reorganized second binary image in generating the difference information.

A representative embodiment of the present invention may also comprise a second binary memory image comprising a second plurality of code objects, and the object ordering software may be capable of storing and retrieving the object order. The object ordering software may process the second binary image to determine the second plurality of code objects, and the object ordering software may link the second plurality of objects based on the object order, using a linking tool, to create a reorganized second binary memory image. The generator may process the first binary image and the reorganized second binary image in generating the difference information. The object ordering software may comprise the linking software. The object ordering software may facilitate maintaining consistent object order between consecutive binary memory image builds. The electronic device may be one of: a mobile handset, a personal digital assistant, a pager, and a personal computer, and updating information may comprise an update package. In a representative embodiment of the present invention, updating information may comprise a set of executable instructions for converting, in the electronic device, a first code version to a second code version.

Additional aspects of the present invention may be observed in a method of generating updating information for updating at least one of: firmware and software in an electronic device. Such a method may comprise linking code objects for a first binary image using a first set of linker information, where the linking may produce first object mapping information. The method may also comprise linking code objects for a second binary image using a second set of linker information, where the linking may produce second object mapping information. The method may also comprise analyzing the first object mapping information and the second object mapping information to determine object order for code objects in the second binary image, generating updated linker information for linking code objects in the second binary image, and linking the code objects in the second binary image using the second linker information, to produce a final binary image. The method may also comprise generating updating information using the first binary image and the final binary image. The updating information may comprise an update package, and the updating information may comprise a set of executable instructions for converting a first version of code to a second version of code, in the electronic device. The electronic device may comprise one of: a mobile handset, a personal digital assistant, a pager, and a personal computer.

Aspects of the present invention may be found in a method of generating optimized update information for converting, in an electronic client device, a first code version to a second code version. In a representative embodiment of the present invention, the first and second code versions may comprise code objects linkable using a software linker. Such a method may comprise accessing first build information for the first code version, accessing second build information for the second code version, and analyzing the build information. The analysis may determine the occurrence of changes in corresponding code objects between the first and second builds, code object linking order information, and file order information. The method may also comprise generating optimized build information for use by a software linker during linking of the second code version, and the generating may employ the results of the analysis. The method may link the code objects of the second code version according to the optimized build information. The linker may produce the second code version. A representative embodiment of the present invention may also comprise generating the optimized update information using the first code version and the second code version. Generating may comprise determining differences between the first and second code versions. The optimized update information may comprise a set of instructions executable in the electronic client device to produce the second code version using the first code version.

Additional aspects of the present invention may be seen in a method of generating optimized update information for converting, in an electronic client device, a first code version to a second code version. Such a method may comprise compiling software components of the first code version to a first set of object code components, and compiling software components of the second code version to a second set of object code components. The method may automatically analyze the first and second sets of object code components and first software linker information, and the analysis may generate optimized software linker information. The method may link the second set of object code components using the optimized software linker information, and the linking may produce the second code version. The method may generate the optimized update information from the first code version and the second code version.

In a representative embodiment of the present invention, compiling may comprise translating high-level language software components to object code components, and compiling may comprise translating assembly language software components to object code components. Analyzing may comprise identifying in the second set of object code components, corresponding object code components in the first set of object code components. Analyzing may also comprise determining a linking order for components in the second set of object code components, using the first software linker information. In addition, analyzing may comprise determining an associated weight for each object code component in the second set of object code components having a corresponding object code component in the first set of object code components. The weight may comprise a measure of frequency of change of code between the corresponding object code components in the first and second sets of object code components. In a representative embodiment of the present invention, allocation of memory space for object code components having a relatively higher associated weight may be done before object code components having a relatively lower associated weight.

In a representative embodiment of the present invention, optimized software linker information may comprise software linker directives used to determine an order of linking of object code components, and optimized software linker information may comprise information descriptive of an order of input of object code component files to a software linker. Software linker information may comprise an address of at least one region of memory in the electronic client device, and software linker information may comprise information representing an order of processing of files of object code components. Analyzing may comprise identifying an occurrence of at least one change in corresponding object code components in the first and second sets of object code components. In various representative embodiments of the present invention, the electronic client device may comprise one of the following: a cellular phone, a personal digital assistant, and a pager, and the update information may comprise a set of instructions executable by the electronic client device, wherein execution of the instructions uses the first code version to produce the second code version.

Yet other aspects of the present invention may be observed in a machine-readable storage having stored thereon a computer program having a plurality of code sections, the code sections executable by a machine for causing the machine to perform the operations described above.

Still other aspects of the preset invention may be seen in a server for producing compact update information for updating software or firmware in an electronic client device containing a first version of code. In a representative embodiment of the present invention, the server may comprise a processor for executing program code, and at least one memory for storing program code and a copy of the first version of code for the electronic device. The at least one memory may be operably coupled to the processor. The server may comprise software linker code executable by the processor for producing a build of an updated version of code for the electronic device using object code components and linker information. In addition, the server may comprise build optimization code resident in the at least one memory. The build optimization code may also analyze two or more builds of code for the electronic device, to generate linker information used by the software linker code to build the updated version of code.

In a representative embodiment of the present invention, the linker information may comprise at least one of the following: information representative of an order of object code components in a version of code, and information representative of an order of files used as input to the software linker code. The server may comprise a personal computer. The server may also comprise generator code for determining differences between the first version of code and the updated version of code. The generator may produce updating information for use by the electronic device to produce the updated version of code from the first version of code. The updating information may comprise a set of instructions executable in the electronic device to transform the first version of code to the updated version of code. The build optimizer code may allocate memory space in the updated version of code based upon a frequency of change of corresponding object code components over a series of builds.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of generating optimized update information for converting, in an electronic client device, a first code version to a second code version, the first and second code versions comprising code objects linkable using a software linker, the method comprising: accessing first build information for the first code version; accessing second build information for the second code version; analyzing the first and second build information, the analysis determining the occurrence of changes in corresponding code objects between the first and second builds, code object linking order information, and file order information; wherein analyzing comprises determining a linking order for components in the second set of object code components, using the first software linker information; re-ordering at least one code object, module or component in the second code version to conform to an order in the first code version; generating optimized build information for use by a software linker during linking of the second code version, the generating employing the results of the analysis; linking the code objects of the second code version according to the optimized build information, the linker producing the a re-ordered second code version stored on a machine-readable storage, wherein the at least one code object, module or component in the re-ordered second code version is reordered to conform to an order in the first code version.

2. The method according to claim 1, further comprising: generating the optimized update information using the first code version and the second code version.

3. The method according to claim 2, wherein generating comprises determining differences between the first and second code versions, and wherein the optimized update information comprises a set of instructions executable in the electronic client device to produce the second code version using the first code version.

4. A method of generating optimized update information for converting, in an electronic client device, a first code version to a second code version, the method comprising: compiling software components of the first code version to a first set of object code components; compiling software components of the second code version to a second set of object code components; automatically analyzing the first and second sets of object code components and first software linker information and re-ordering at least one code object, module or component in the second set of object code components to conform to an order in the first set of object code components, the analysis generating optimized software linker information; wherein analyzing comprises determining a linking order for components in the second set of object code components, using the first software linker information; linking the second set of object code components using the optimized software linker information, the linking producing a re-ordered second code version stored on a machine-readable storage wherein at least one code object, module or component in the second code version is reordered to conform to an order in the first code version; and generating the optimized update information from the first code version and the re-ordered second code version.

5. The method according to claim 4 wherein compiling comprises translating high-level language software components to object code components.

6. The method according to claim 4 wherein compiling comprises translating assembly language software components to object code components.

7. The method according to claim 4 wherein analyzing comprises identifying in the second set of object code components, corresponding object code components in the first set of object code components.

8. The method according to claim 4 wherein analyzing comprises determining an associated weight for each object code component in the second set of object code components having a corresponding object code component in the first set of object code components, and wherein the weight comprises a measure of frequency of change of code between corresponding object code components in the first and second sets of object code components.

9. The method according to claim 8 wherein allocation of memory space for object code components having a relatively higher associated weight is done before object code components having a relatively lower associated weight.

10. The method according to claim 4 wherein optimized software linker information comprises software linker directives used to determine an order of linking of object code components.

11. The method according to claim 4 wherein optimized software linker information comprises information descriptive of an order of input of object code component files to a software linker.

12. The method according to claim 4 wherein software linker information comprises an address of at least one region of memory in the electronic client device.

13. The method according to claim 4 wherein software linker information comprises information representing an order of processing of files of object code components.

14. The method according to claim 4 wherein analyzing comprises identifying an occurrence of at least one change in corresponding object code components in the first and second sets of object code components.

15. The method according to claim 4 wherein the electronic client device comprises one of the following: a cellular phone, a personal digital assistant, and a pager.

16. The method according to claim 4 wherein the update information comprises a set of instructions executable by the electronic client device, wherein execution of the instructions uses the first code version to produce the second code version.

17. A machine-readable storage, having stored thereon a computer program having a plurality of code sections for generating optimized update information for converting, in an electronic client device, a first code version to a second code version, the first and second code versions comprising code objects linkable using a software, the code sections executable by a machine for causing the machine to perform the operations comprising: accessing first build information for the first code version; accessing second build information for the second code version; analyzing the first and second build information, the analysis determining the occurrence of changes in corresponding code objects between the first and second builds, code object linking order information, and file order information; wherein analyzing comprises determining a linking order for components in the second set of object code components, using the first software linker information; re-ordering at least one code object, module or component in the second code version to conform to an order in the first code version; generating optimized build information for use by a software linker during linking of the second code version, the generating employing the results of the analysis; and linking the code objects of the second code version using the optimized build information, the linker producing a re-ordered second code version, wherein the at least one code object, module or component in the second code version is reordered to conform to an order in the first code version.

18. The machine-readable storage according to claim 17 wherein the code sections executable by a machine further causing the machine to perform the operations comprising: generating the optimized update information using the first code version and the second code version.

19. The machine-readable storage according to claim 17, wherein generating comprises determining differences between the first and second code versions, and wherein the optimized update information comprises a set of instructions executable in the electronic client device to produce the second code version using the first code version.

20. A machine-readable storage, having stored thereon a computer program having a plurality of code sections for generating optimized update information for converting, in an electronic client device, a first code version to a second code version, the code sections executable by a machine for causing the machine to perform the operations comprising: compiling software components of the first code version to a first set of object code components; compiling software components of the second code version to a second set of object code components; automatically analyzing the first and second sets of object code components and first software linker information wherein analyzing comprises determining a linking order for components in the second set of object code components, using the first software linker information and re-ordering at least one code object, module or component in the second set of object code components to conform to an order in the first set of object code components, the analysis generating optimized software linker information; linking the second set of object code components using the optimized software linker information, the linking producing the a re-ordered second code version, wherein at least one code object, module or component in the second code version is reordered to conform to an order in the first code version; and generating the optimized update information from the first code version and the re-ordered second code version.

21. The machine-readable storage according to claim 20 wherein compiling comprises translating high-level language software components to object code components.

22. The machine-readable storage according to claim 20 wherein compiling comprises translating assembly language software components to object code components.

23. The machine-readable storage according to claim 20 wherein analyzing comprises identifying in the second set of object code components, corresponding object code components in the first set of object code components.

24. The machine-readable storage according to claim 20 wherein analyzing comprises determining an associated weight for each object code component in the second set of object code components having a corresponding object code component in the first set of object code components, and wherein the weight comprises a measure of frequency of change of code between corresponding object code components in the first and second sets of object code components.

25. The machine-readable storage according to claim 24 wherein allocation of memory space for object code components having a relatively higher associated weight is done before object code components having a relatively lower associated weight.

26. The machine-readable storage according to claim 20 wherein optimized software linker information comprises software linker directives used to determine an order of linking of object code components.

27. The machine-readable storage according to claim 20 wherein optimized software linker information comprises information descriptive of an order of input of object code component files to a software linker.

28. The machine-readable storage according to claim 20 wherein software linker information comprises an address of at least one region of memory in the electronic client device.

29. The machine-readable storage according to claim 20 wherein software linker information comprises information representing an order of processing of files of object code components.

30. The machine-readable storage according to claim 20 wherein analyzing comprises identifying an occurrence of at least one change in corresponding object code components in the first and second sets of object code components.

31. The machine-readable storage according to claim 20 wherein the electronic client device comprises one of the following: a cellular phone, a personal digital assistant, and a pager.

32. The machine-readable storage according to claim 20 wherein the update information comprises a set of instructions executable by the electronic client device, wherein execution of the instructions uses the first code version to produce the second code version.

33. A server for producing compact update information for updating software or firmware in an electronic client device containing a first version of code, the server comprising: a processor for executing program code; at least one memory for storing program code and a copy of the first version of code for the electronic device, the at least one memory operably coupled to the processor; software linker code executable by the processor for producing a build of an updated version of code for the electronic device using object code components and linker information; build optimization code resident in the at least one memory; and wherein the build optimization code analyzes two or more builds of code for the electronic device, wherein analyzing comprises determining a linking order for components in the second set of object code components, using the first software linker information; and re-orders at least one code object, module or component in one of the two or more builds of code to conform to an order in one of the other of the two or more builds of code to generate linker information used by the software linker code to build the updated version of code.

34. The server according to claim 33, wherein the linker information comprises at least one of the following: information representative of an order of object code components in a version of code, and information representative of an order of files used as input to the software linker code.

35. The server according to claim 33, wherein the server comprises a personal computer.

36. The server according to claim 33, wherein the server further comprises generator code for determining differences between the first version of code and the updated version of code, the generator producing updating information for use by the electronic device to produce the updated version of code from the first version of code.

37. The server according to claim 36, wherein the updating information comprises a set of instructions executable in the electronic device to transform the first version of code to the updated version of code.

38. The server according to claim 33, wherein the build optimizer code allocates memory space in the updated version of code based upon a frequency of change of corresponding object code components over a series of builds.

* * * * *

UNITED STATES PATENT AND TRADEMARK OFFICE
CERTIFICATE OF CORRECTION

PATENT NO. : 7,694,291 B2  Page 1 of 1
APPLICATION NO. : 11/352813
DATED : April 6, 2010
INVENTOR(S) : Shao-Chun Chen et al.

It is certified that error appears in the above-identified patent and that said Letters Patent is hereby corrected as shown below:

In column 25, line 8, in Claim 1, delete "the a" and insert -- a --, therefor.

In column 27, line 15, in Claim 20, delete "the a" and insert -- a --, therefor.

Signed and Sealed this

Sixth Day of July, 2010

David J. Kappos
*Director of the United States Patent and Trademark Office*